(12) United States Patent
Malamal Vadakital et al.

(10) Patent No.: US 9,922,680 B2
(45) Date of Patent: Mar. 20, 2018

(54) METHOD, AN APPARATUS AND A COMPUTER PROGRAM PRODUCT FOR PROCESSING IMAGE SEQUENCE TRACKS

(71) Applicant: Nokia Technologies Oy, Espoo (FI)

(72) Inventors: Vinod Kumar Malamal Vadakital, Tampere (FI); Miska Matias Hannuksela, Tampere (FI); Jani Lainema, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 302 days.

(21) Appl. No.: 14/618,650

(22) Filed: Feb. 10, 2015

(65) Prior Publication Data

US 2016/0232939 A1   Aug. 11, 2016

(51) Int. Cl.
 *G11B 27/00* (2006.01)
 *G11B 27/031* (2006.01)
 *G11B 27/30* (2006.01)

(52) U.S. Cl.
 CPC .......... *G11B 27/031* (2013.01); *G11B 27/309* (2013.01)

(58) Field of Classification Search
 None
 See application file for complete search history.

(56) References Cited

U.S. PATENT DOCUMENTS

| 2008/0052306 | A1* | 2/2008 | Wang | H04N 7/52 |
| 2010/0153395 | A1* | 6/2010 | Hannuksela | G11B 27/102 |
| | | | | 707/737 |
| 2012/0016917 | A1* | 1/2012 | Priddle | H04N 5/91 |
| | | | | 707/827 |
| 2014/0192151 | A1* | 7/2014 | Wang | H04N 19/597 |
| | | | | 348/43 |

OTHER PUBLICATIONS

ISO/IEC JTC 1/SC 29 Document N14642: "Information Technology—MPEG systems technologies—Part 12: Image file format," Jul. 7-11, 2014, Sapporo, Japan.*
"Information Technology—Coding of Audio-Visual Objects—Part 10: Advanced Video Coding", ISO/IEC 14496-10, Second edition, Oct. 1, 2004, 280 pages.

(Continued)

*Primary Examiner* — Andy Rao
*Assistant Examiner* — Tyler Edwards
(74) *Attorney, Agent, or Firm* — Alston & Bird LLP

(57) ABSTRACT

There are disclosed various methods, apparatuses and computer program products for video encoding. According to an embodiment, an encoding method comprises including a static media item into a container file; including one or more media tracks into the container file; indicating, in the file, that the static media item and one or more entities form a group; and indicating, in the file, a grouping type for the group. According to an embodiment, a decoding method comprises parsing, from a container file, that a static media item and one or more entities form a group; parsing, from the container file, a grouping type for the group; determining a processing for the static media item and the one or more of the entities based on the group and the grouping type.

11 Claims, 15 Drawing Sheets

(56) References Cited

OTHER PUBLICATIONS

"Information Technology—Coding of Audio-Visual Objects—Part 12: ISO Base Media File Format", ISO/IEC 14496-12, Third edition, Oct. 15, 2008, 120 pages.
"Advanced Video Coding for Generic Audiovisual Services", Series H: Audiovisual and Multimedia Systems, Infrastructure of audiovisual services—Coding of moving video, Recommendation ITU-T H.264, Mar. 2010, 676 pages.
"High Efficiency Video Coding", Series H: Audiovisual and Multimedia Systems, Infrastructure of audiovisual services—Coding of moving video, Recommendation ITU-T H.265, Oct. 2014, 540 pages.
"Information Technology—Coding of Audio-Visual Objects—Part 14: MP4 File Format", ISO/IEC14496-14, First edition, Nov. 15, 2003, 18 pages.
"Information Technology—Coding of Audio-Visual Objects—Part 15: Advanced Video Coding (AVC) File Format", ISO/IEC 14496-15, First edition, Apr. 15, 2004, 29 pages.
"3rd Generation Partnership Project; Technical Specification Group Services and System Aspects; Transparent end-to-end packet switched streaming service (PSS); 3GPP file format (3GP) (Release 13)", 3GPP TS 26.244, V13.0.0, Dec. 2014, 64 pages.
International Search Report and Written Opinion received for corresponding Patent Cooperation Treaty Application No. PCT/FI2016/050064, dated May 4, 2016, 14 pages.
"Information Technology—MPEG Systems Technologies—Part 12: Image File Format", ISO/IEC CD 23008-12 1st Edition, ISO/IEC JTC 1/SC 29 N, N14642, Apr. 2013, 31 pages.

\* cited by examiner

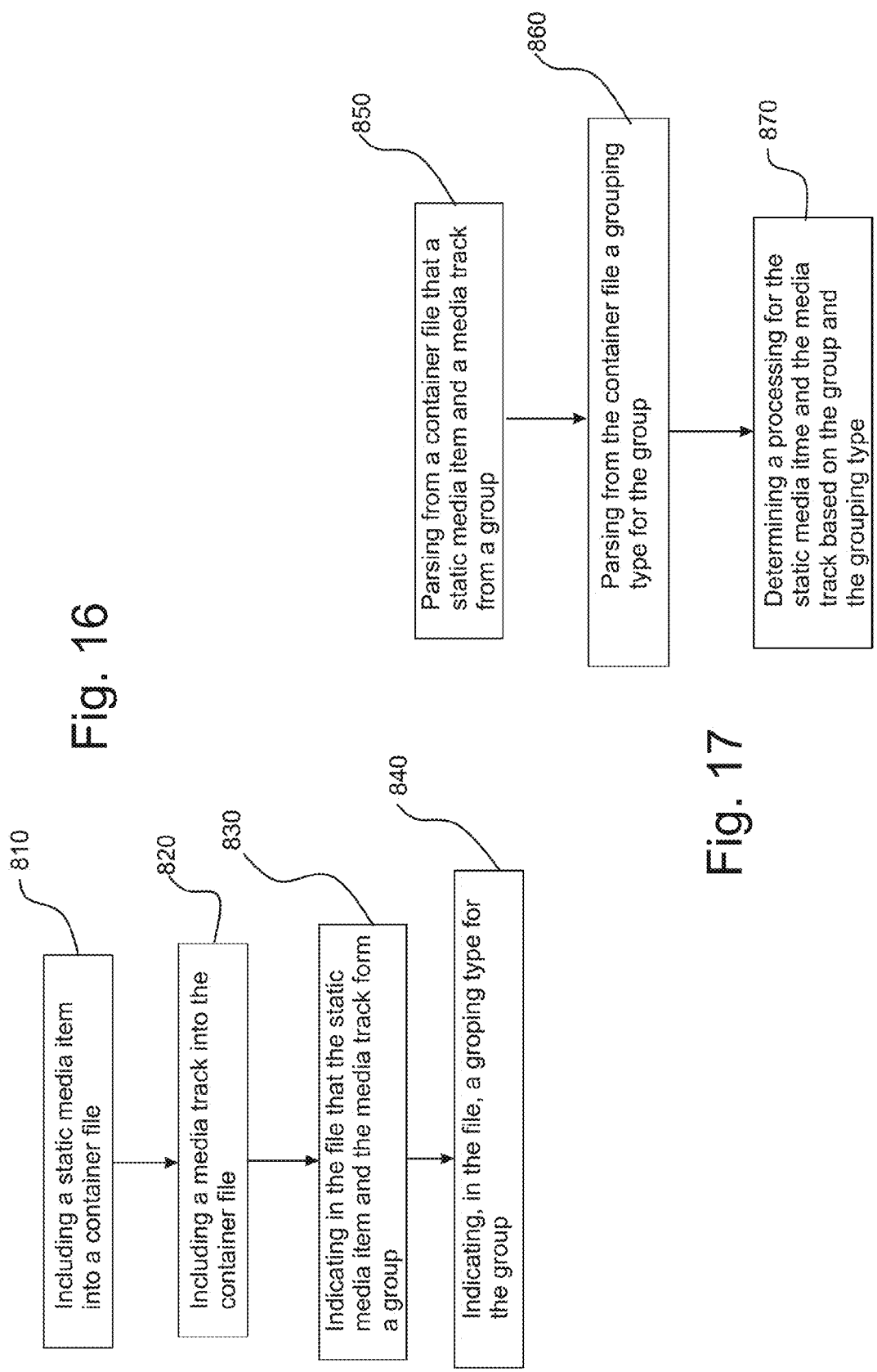

METHOD, AN APPARATUS AND A COMPUTER PROGRAM PRODUCT FOR PROCESSING IMAGE SEQUENCE TRACKS

TECHNICAL FIELD

The present application relates to an image file format, and in particularly processing semantically related image sequence tracks.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

MPEG-H image file format is a derived specification of the ISO Base Media File Format (ISOBMFF). It has been currently specified to contain (by inclusion and/or by reference) HEVC coded still images and image sequences. The image file format, similar to the ISOBMFF, uses an object oriented mechanism, where each object is called a box. All media data and its related metadata are encapsulated into boxes. Each box is identified by a four character code (4CC) and starts with a header which informs about the type and size of the box.

ISOBMFF comprises an alternate group mechanism, a track group mechanism and a sample grouping mechanism. The alternate group mechanism can be used to indicate that tracks are alternatives to each other. The track grouping mechanism can be used to indicate that tracks are grouped according to an indicated grouping criterion. The sample grouping mechanism can be used to indicate that certain properties apply to an indicate group of samples within a track.

There is a need for an improved solution for grouping items, a combination of items and tracks, or a smaller groups into bigger groups.

SUMMARY

Some embodiments provide a method for encoding and decoding video information.

Various aspects of examples of the invention are provided in the detailed description.

According to a first aspect, there is provided a method comprising:
including a static media item into a container file;
including one or more media tracks into the container file;
indicating, in the file, that the static media item and one or more entities form a group;
and indicating, in the file, a grouping type for the group.

According to a second aspect, there is provided an apparatus comprising at least one processor; and at least one memory including computer program code the at least one memory and the computer program code configured to, with the at least one processor, cause the apparatus to perform at least the following:
including a static media item into a container file;
including one or more media tracks into the container file;
indicating, in the file, that the static media item and one or more entities form a group;
and indicating, in the file, a grouping type for the group.

According to a third aspect, there is provided a non-transitory computer-readable medium encoded with instructions that, when executed by a computer, perform
including a static media item into a container file;
including one or more media tracks into the container file;
indicating, in the file, that the static media item and one or more entities form a group;
and indicating, in the file, a grouping type for the group.

According to an embodiment, one or more entities are selected from the following:
an indicated track of the one or more tracks;
an indicated group of the one or more tracks;
an indicated sub-track;
an indicated sample grouping of a track referring to all samples that are mapped to any sample group description entries of the sample grouping;
samples mapped to particular indicated sample group description entry or entries of an indicated sample grouping of an indicated track;
another static media item.

According to an embodiment, an indicated group of the one or more tracks, is one of the following: an alternate group of tracks or a track group of certain indicated type.

According to an embodiment, the grouping indicates one or more of the following: grouped items and tracks are alternatives to each other; an identified item or track is used for preview purposes for another identified item or track; items or tracks have the same origin; the grouped items or tracks represent the same scene from different viewpoints; a grouped derived image item has been used as input for encoding of grouped coded image items; grouped items and tracks are identical.

According to an embodiment, grouped items and tracks that are alternative to each other indicate one or more of the following: an animation and a still image are alternatives; optional operations for derived images; a pre-computed derived image and the respective derived image are alternatives.

According to an embodiment, information of alternative pictures are included into the container file.

According to an embodiment, an identifier is assigned to an entity.

According to an embodiment, a first identifier value is assigned to the first entity and a second identifier value is assigned to the second entity.

According to an embodiment, information of alternative pictures relates to alternate groups of pictures, based on one of the following characteristics: different spatial resolutions; different picture aspect ratio; different bit depths; different color gamuts.

According to a fourth aspect, there is provided a decoding method comprising
parsing, from a container file, that a static media item and one or more entities form a group;
parsing, from the container file, a grouping type for the group;
determining a processing for the static media item and the one or more of the entities based on the group and the grouping type.

According to a fifth aspect, there is provided an apparatus comprising at least one processor; and at least one memory including computer program code the at least one memory and the computer program code configured to, with the at least one processor, cause the apparatus to perform at least the following:
parsing, from a container file, that a static media item and one or more entities form a group;

parsing, from the container file, a grouping type for the group;

determining a processing for the static media item and the one or more of the entities based on the group and the grouping type.

According to a fifth aspect, there is provided a non-transitory computer-readable medium encoded with instructions that, when executed by a computer, perform parsing, from a container file, that a static media item and one or more entities form a group;

parsing, from the container file, a grouping type for the group;

determining a processing for the static media item and the one or more of the entities based on the group and the grouping type.

According to an embodiment, an entity is one of the following:

an indicated track of the one or more tracks;
an indicated group of the one or more tracks;
an indicated sub-track;
an indicated sample grouping of a track referring to all samples that are mapped to any sample group description entries of the sample grouping;
samples mapped to particular indicated sample group description entry or entries of an indicated sample grouping of an indicated track;
another static media item.

According to an embodiment, grouping indicates one or more of the following: grouped items and tracks are alternatives to each other; an identified item or track is used for preview purposes for another identified item or track; items or tracks have the same origin; the grouped items or tracks represent the same scene from different viewpoints; a grouped derived image item has been used as input for encoding of grouped coded image items; grouped items and tracks are identical.

According to an embodiment, said grouping type indicates that grouped items and tracks are alternatives to each other and said determining comprises selecting one of the static media item and the one or more of the entities for displaying.

According to an embodiment, grouped items and tracks that are alternative to each other indicate one or more of the following: an animation and a still image are alternatives; optional operations for derived images; a pre-computed derived image and the respective derived image are alternatives.

According to an embodiment, information of alternative pictures is parsed from the container file.

According to an embodiment, it is determined that a first picture and a second picture are alternatives by parsing that a first value associated with the first picture and a second value associated with the second picture have a same value.

According to an embodiment, the media file characteristics are parsed from the container file, according to which media file characteristics an alternate group is formed, and picture-specific information related to the characteristics.

BRIEF DESCRIPTION OF THE DRAWINGS

For a more complete understanding of example embodiments of the present invention, reference is now made to the following descriptions taken in connection with the accompanying drawings in which:

FIG. 16 is a flowchart of a method for encoding according to an embodiment; and

FIG. 17 is a flowchart of a method for decoding according to an embodiment.

DETAILED DESCRIPTION OF SOME EXAMPLE EMBODIMENTS

Figure 2:
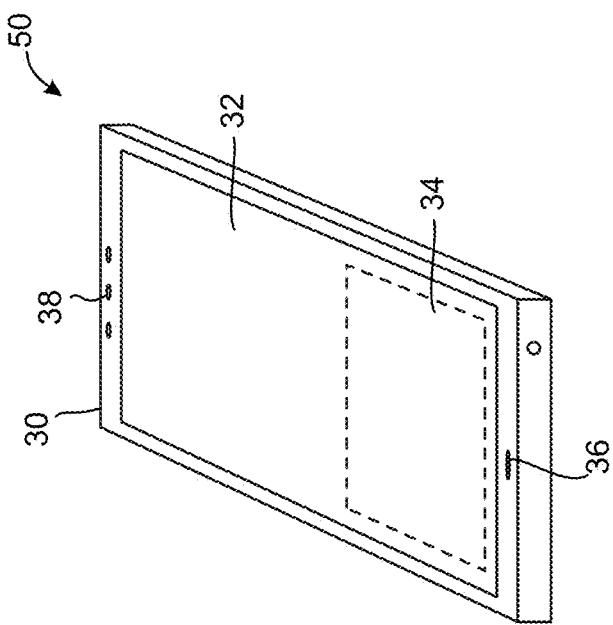
FIG. 2 illustrates a layout of an apparatus according to an embodiment.
Figure 1:
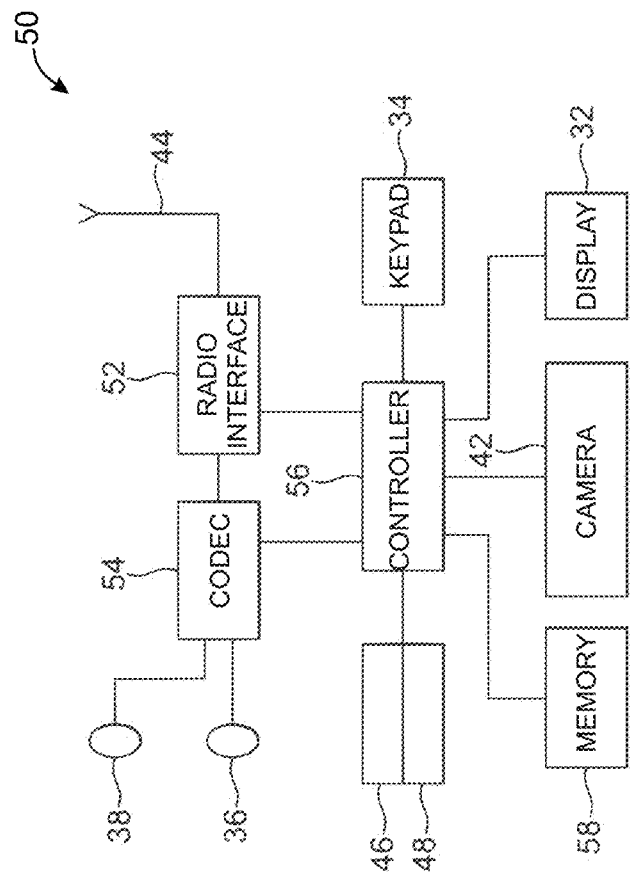
FIG. 1 illustrates a block diagram of a video coding system according to an embodiment.

FIG. 1 shows a video coding system as a schematic block diagram of an apparatus or electronic device 50 according to an embodiment. The electronic device 50 may incorporate a codec according to an embodiment. FIG. 2 shows a layout of an apparatus according to an embodiment. The elements of FIGS. 1 and 2 will be explained next.

The electronic device 50 may for example be a mobile terminal or user equipment of a wireless communication system. However, it is appreciated that embodiments of the invention may be implemented within any electronic device or apparatus which may require encoding and decoding, or encoding or decoding video images.

The apparatus 50 may comprise a housing 30 for incorporating and protecting the device. The apparatus 50 further may comprise a display 32 in the form of a liquid crystal display. In other embodiments, the display may be any suitable display technology suitable to display an image or video. The apparatus 50 may further comprise a keypad 34. According to an embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which—according to an embodiment—may be any one of: an earpiece 38, speaker, or an analogue audio or digital audio output connection. The apparatus 50 may also comprise a battery 40 (or in an embodiment, the device may be powered by any suitable mobile energy device, such as solar cell, fuel cell or clockwork generator). The apparatus may further comprise a camera 42 capable of recording or capturing images and/or video. According to an embodiment, the apparatus 50 may further comprise an infrared port for short range line of sight communication to other devices. According to an embodiment, the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which according to an embodiment may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 56 may further comprise a card reader 48 and a smart card 46, for example a UICC and UICC reader for providing user information and being suitable for providing authentication information for authentication and authorization of the user at a network.

The apparatus 50 may further comprise a radio interface circuitry 52 connected to the controller and suitable for generating wireless communication signals for example for communication with a cellular communications network, a wireless communication system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

According to an embodiment, the apparatus 50 comprises a camera capable of recording or detecting individual frames which are then passed to the codec 54 or controller for processing. According to an embodiment, the apparatus may receive the video image data for processing from another device prior to transmission and/or storage. According to an embodiment, the apparatus 50 may receive either wirelessly or by a wired connection the image for coding/decoding.

Figure 3:
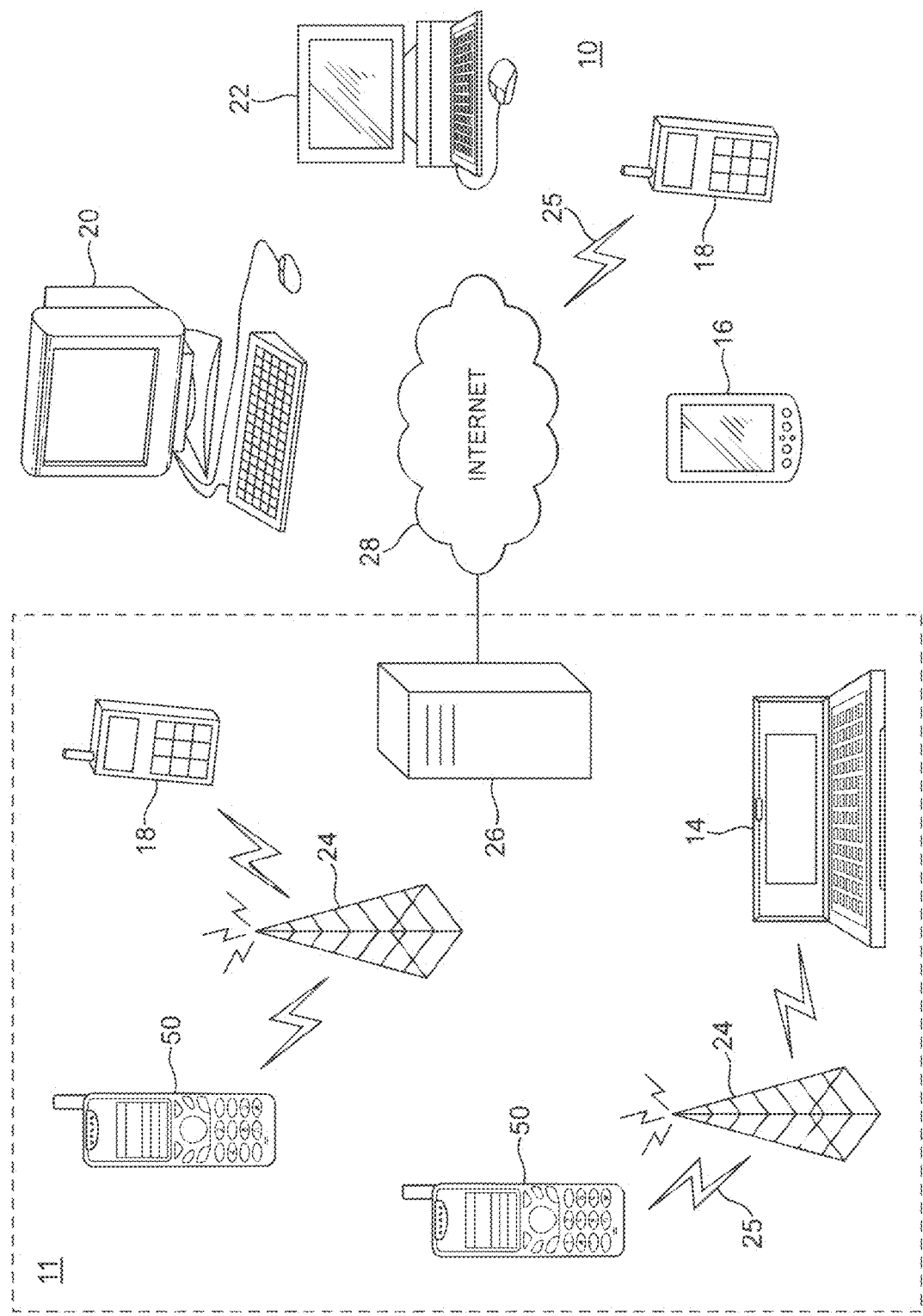
FIG. 3 illustrates an arrangement for video coding comprising a plurality of apparatuses, networks and network elements according to an embodiment.

FIG. 3 shows an arrangement for video coding comprising a plurality of apparatuses, networks and network elements according to an embodiment. With respect to FIG. 3, an example of a system within which embodiments of the invention can be utilized is shown. The system 10 comprises multiple communication devices which can communicate through one or more networks. The system 10 may comprise any combination of wired or wireless networks including but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network and the Internet.

The system 10 may include both wired and wireless communication devices or apparatus 50 suitable for implementing embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, any combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS) email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections and any suitable connection.

Video coder may comprise an encoder that transforms the input video into a compressed representation suited for storage/transmission, and a decoder is able to uncompress the compressed video representation back into a viewable form. The encoder may discard some information in the original video sequence in order to represent the video in more compact form (i.e. at lower bitrate). A video encoder may be used to encode an image sequence, as defined subsequently, and a video decoder may be used to decode a coded image sequence. A video encoder or an intra coding part of a video encoder or an image encoder may be used to encode an image, and a video decoder or an inter decoding part of a video decoder or an image decoder may be used to decode a coded image.

Figure 4:
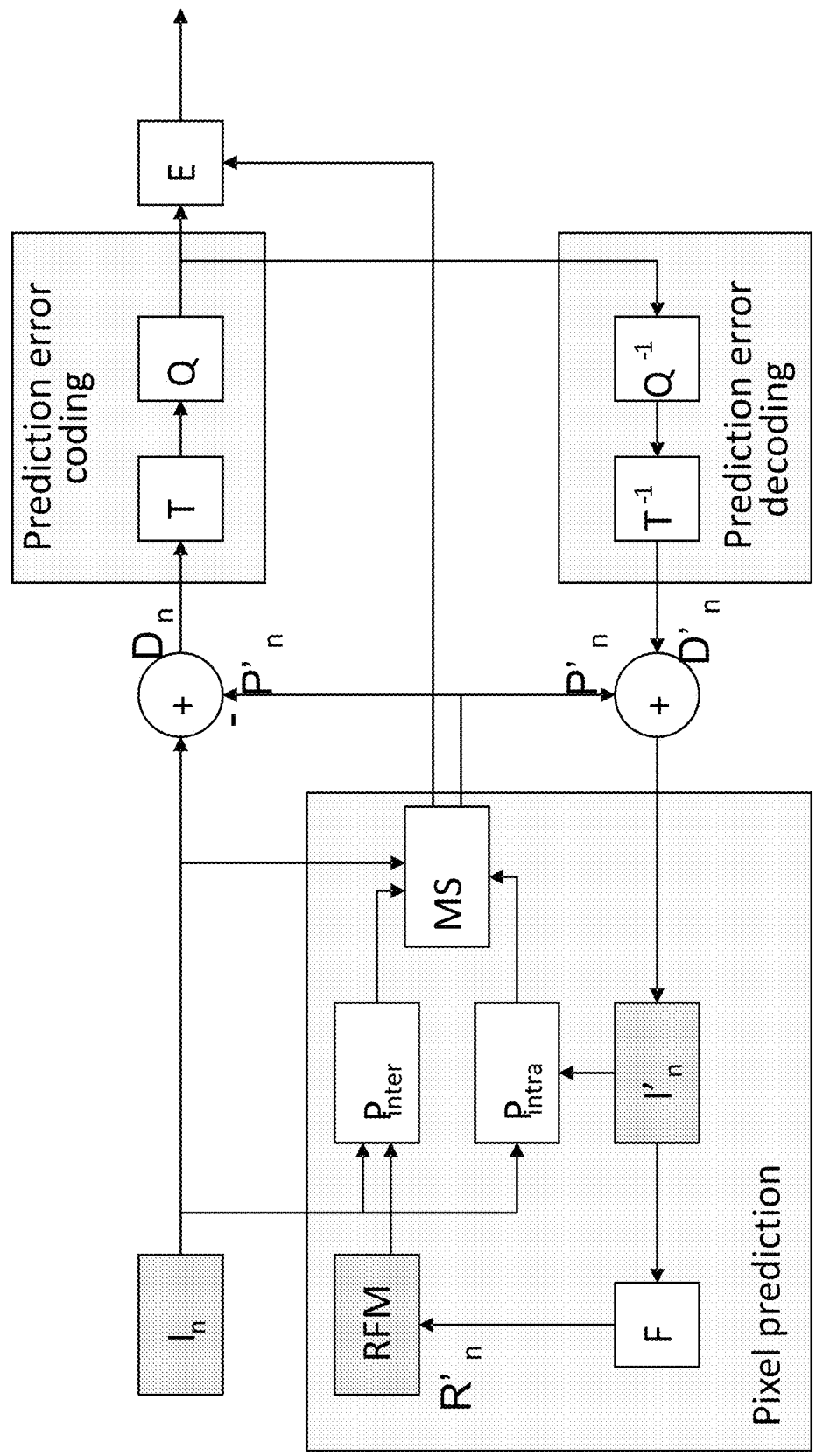
FIG. 4 illustrates a block diagram of a video encoder according to an embodiment.

The encoding process is illustrated in FIG. 4. FIG. 4 illustrates an example of a video encoder, where $I_n$: Image to be encoded; $P'_n$: Predicted representation of an image block; $D_n$: Prediction error signal; $D'_n$: Reconstructed prediction error signal; $I'_n$: Preliminary reconstructed image; $R'_n$: Final reconstructed image; $T, T^{-1}$: Transform and inverse transform; $Q, Q^{-1}$: Quantization and inverse quantization; E: Entropy encoding; RFM: Reference frame memory; $P_{inter}$: Inter prediction; $P_{intra}$: Intra prediction; MS: Mode selection; F: Filtering.

Figure 5:
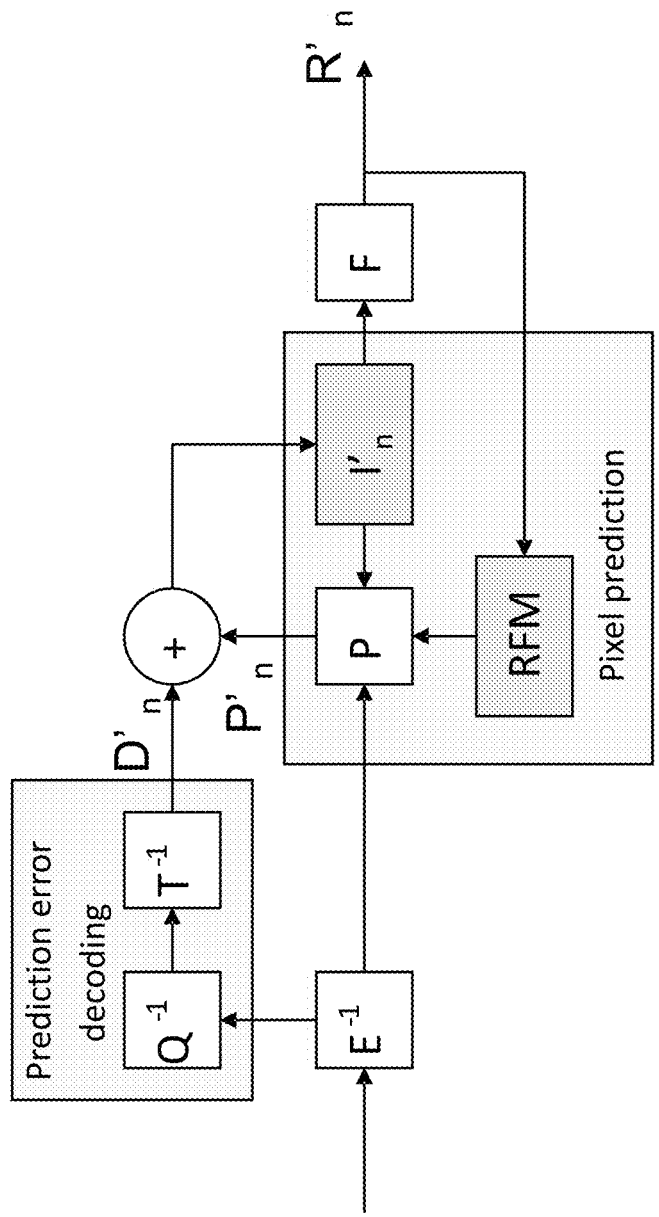
FIG. 5 illustrates a block diagram of a video decoder according to an embodiment.

The decoding process is illustrated in FIG. 5. FIG. 5 illustrates a block diagram of a video decoder where $P'_n$: Predicted representation of an image block; $D'_n$: Reconstructed prediction error signal; $I'_n$: Preliminary reconstructed image; $R'_n$: Final reconstructed image; $T^{-1}$: Inverse transform; $Q^{-1}$: Inverse quantization; $E^{-1}$: Entropy decoding; RFM: Reference frame memory; P: Prediction (either inter or intra); F: Filtering.

The Advanced Video Coding (H.264/AVC a.k.a. AVC) standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was pre-published as ITU-T Recommendation H.265 (October 2014) and is likely to be published as Edition 2 of ISO/IEC 23008-2 in 2015. There are currently ongoing standardization projects to develop further extensions to H.265/HEVC, including three-dimensional and screen content coding extensions, which may be abbreviated 3D-HEVC and SCC, respectively.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Available media file format standards include ISO base media file format (ISO/IEC 14496-12, which may be abbreviated ISOBMFF) as well as standards derived from the ISOBMFF, such as MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISO/IEC 14496-15 specifies the storage of bitstreams of H.264/AVC and/or HEVC and/or their extensions in ISOBMFF compliant files. The mentioned file formats (including the ISO file format itself) as well as other file formats derived from the ISOBMFF may be called the ISO family of file formats.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

One building block in the ISO base media file format is called a box. Each box may have a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes. Each box of the ISO base media file may be identified by a four-character code (4CC, fourCC). A four-character code may interchangeably be represented by a 32-bit unsigned integer (by assuming a certain conversion of characters to 8-bit values, a certain bit endianness, and a certain byte endianness). The header may provide information about the type and size of the box.

According to the ISO family of file formats, a file may include media data and metadata that may be enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track (trak) box. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected. Samples of a track may be implicitly associated with sample numbers that may be incremented e.g. by 1 in the indicated decoding order of samples. The first sample in a track may be associated with sample number 1.

The 'trak' box contains a Sample Table box. The Sample Table box comprises e.g. all the time and data indexing of the media samples in a track. The Sample Table box is required to contain a Sample Description box. The Sample Description box includes an entry count field, specifying the number of sample entries included in the box. The Sample Description box is required to contain at least one sample entry. The sample entry format depends on the handler type for the track. Sample entries give detailed information about the coding type used and any initialization information needed for that coding.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, which may also be included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping. The 'sbgp' and the 'sgpd' boxes may be linked using the value of grouping_type and, in some versions of the boxes, also the value of grouping_type_parameter. The 'sbgp' box indicates the index of the sample group description entry that a particular sample belongs to.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using XML syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

In order to support more than one meta box at any level of the hierarchy (file, movie, or track), a meta box container box ('meco') may be used as one ISO base media file format. The meta box container box may carry any number of additional meta boxes at any level of the hierarchy (file, movie, or track). This may allow that e.g. the same metadata is being presented in two different, alternative metadata systems. The meta box relation box ('mere') may enable describing how different meta boxes relate to each other, e.g. whether they contain exactly the same metadata (but described with different schemes) or if one represents a superset of another one.

URL fragment identifiers (which may also be referred to as URL forms) may be specified for a particular content type to access a part of the resource, such as a file, indicated by the base part of the URL (without the fragment identifier). URL fragment identifiers may be identified for example by a hash ('#') character within the URL. For the ISOBMFF, it may be specified that URL fragments "#X" refers to a track with track_ID equal to X, "#item_ID=" and "#item_name=" refer to file level meta box(es), "#/item_ID=" and "#/item_name=" refer to the meta box(es) in the Movie box, and "#track_ID=X/item_ID=" and "#track_ID=X/item_name=" refer to meta boxes in the track with track_ID equal to X, including the meta boxes potentially found in movie fragments.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

MPEG-H Image File Format (ISO/IEC 23008-12) is a derived specification of the ISO Base Media File Format (ISOBMFF). At the time of writing this patent application, ISO/IEC 23008-12 was a draft standard and hence it needs to be understood that the name and/or nickname of the standard may therefore change in the final version of the standard. Names such as ISO Image File Format (ISOIFF) and MPEG Image File Format have been considered. Within the standard specification itself (or otherwise when the context is clear), the name "the Image File Format" can be used to refer to ISO/IEC 23008-12.

Some concepts, structures, and specifications of MPEG-H Image File Format are described below as an example of a container file format, based on which the embodiments may be implemented. The aspects of the invention are not limited to MPEG-H Image File Format, but rather the description is given for one possible basis on top of which the invention may be partly or fully realized.

The MPEG-H Image File Format derives its basic structures from the ISOBMFF. Thus, the MPEG-H Image File Format, similar to the ISOBMFF, uses an object oriented mechanism, where each object is called a box. All media data and its related metadata are encapsulated into boxes. Each box is identified by a four character code (4CC) and starts with a header which informs about the type and size of the box.

According to the MPEG-H Image File Format, still images are stored as items. It may be required that image items containing coded images are independently coded and do not depend on any other item in their decoding.

In the context of the MPEG-H Image File Format, the following boxes may be contained within the root-level 'meta' box and may be used as described in the following. In the MPEG-H image file format, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Given a collection images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with auxiliary image such as an alpha plane. A cover image among the collection of images is indicated using the 'pitm' box. A thumbnail image or an auxiliary image is linked to the primary image item using an item reference of type 'thmb' or 'auxl', respectively.

The MPEG-H Image File Format supports derived images. An item is a derived image, when it includes a 'dimg' item reference to another item. A derived image is obtained by performing a specified operation, such as rotation, to specified input images. The operation performed to obtain the derived image is identified by the item_type of the item. The image items used as input to a derived image may be coded images, e.g. with item type 'hvc1', or they may be other derived image items.

The MPEG-H Image File Format specification includes the specification of the clean aperture (i.e. cropping) operation, a rotation operation for multiple-of-90-degree rotations, and an image overlay operation. The image overlay 'iovl' derived image locates one or more input images in a given layering order within a larger canvas.

The derived image feature of the MPEG-H Image File Format is extensible so that external specifications as well as later version of the MPEG-H Image File Format itself can specify new operations.

The following definitions may be used e.g. in the context of the MPEG-H Image File Format or similar file formats. A coded image may be defined as a coded representation of an image. A derived image may be defined as an image that is represented in a file by an indicated operation to indicated images and can be obtained by performing the indicated operation to the indicated images. An image may be defined as a coded image, a derived image, or one or more arrays of pixels of different colour components, depending on the context where the term image is used. An image collection may be defined as a set of images stored as items of a single file according to MPEG-H Image File Format (or alike). An auxiliary image may be defined as an image that may not be intended to be displayed but provides supplemental information, such as transparency data, complementing a respective primary image. A cover image may be defined as an image that is representative of an image collection or an image sequence and should be displayed when no other information is available on the preferred displaying method of the image collection or the image sequence. A pre-computed derived image may be defined as a coded image that has been derived from one or more other images. A primary image may be defined as an image that is stored as an item and is not an auxiliary image or a thumbnail image. A thumbnail image may be defined as a smaller-resolution representation of a primary image.

An image sequence may be defined as a sequence of images which may be associated with advisory timing and in which images may be inter predicted. In the MPEG-H Image File Format, image sequences are stored according to the track mechanism of the ISOBMFF. An image sequence track is used when there is coding dependency between images or when the playback of the images is timed. The timing in the image sequence track may be defined to be advisory for the players. In order to distinguish between image sequences and motion video, a new handler type 'pict' has been introduced in the MPEG-H Image File Format.

The MPEG-H Image File Format includes specifications to encapsulate (by inclusion and/or by reference) HEVC coded still images and image sequences into files conforming to the MPEG-H Image File Format. It is possible to specify encapsulation of images and image sequences coded with other coding formats into files conforming to the MPEG-H Image File Format.

A grouping mechanism is not yet been made available for items in a 'meta' box. Furthermore, there are use case where set of images defined using the 'meta' box structure and an image sequences (or other timed media) defined using the track structure can be linked semantically. A way to indicate this semantic link between differently coded structures has not been defined by the MPEG-H Image File Format.

In the current specification of the MPEG-H Image File Format, there is no consistent way of handling groups of still images and image sequence tracks that are semantically related. For example, an image capturing device may also record a short burst of images along with a capture of a high quality image. Both the image burst and the high quality image can be stored in the image file format. However, there is currently no way to hint that the image burst and the high quality image are semantically related and so it is able to decide how to present the contents of the file.

In another example, a content provider may decide to store a multi-view image as a set of independently coded images. When storing this in the MPEG-H Image File Format, each of these views can be coded using HEVC still image profile. However, there is currently no way to tell a reader that the set of images stored in a file can be rendered as a multi-view image.

Currently, an alternate group mechanism of ISOBMFF can be used to indicate that tracks are alternatives to each other. The Track Header box contains the alternate_group syntax element. When the value of alternate_group is equal for two or more tracks, these tracks belong to the same alternate group of tracks and can be defined to be alternatives to each other. Only one track within an alternate group should be selected for playback.

All tracks in an alternate group are candidates for media selection, but it might not make sense to switch between some of those tracks during a session or during playback. One may for instance allow switching between video tracks at different bitrates and keep frame size but not allow switching between tracks of different frame size. In the same manner it may be desirable to enable selection—but not switching—between tracks of different video codecs or different audio languages. The distinction between tracks for selection and switching may be addressed by assigning tracks to switch groups in addition to alternate groups. One alternate group may contain one or more switch groups. All tracks in an alternate group are candidates for media selection, while tracks in a switch group are also available for switching during a session. Different switch groups may be considered to represent different points of operation, such as different frame size, high/low quality, etc.

The sub-track feature of the ISOBMFF may be used to assign parts of tracks to alternate and switch groups in the same way as (entire) tracks can be assigned to alternate and switch groups to indicate whether those tracks are alternatives to each other and whether it makes sense to switch between them during a session. Sub-tracks are suitable for layered media, where a sub-track may enclose a subset of the layers represented by the track. By defining alternate and switch groups at sub-track level it may be possible to use existing rules for media selection and switching for such layered codecs. Sub-track level alternate and switch groups use the same numbering as track level groups. The numberings are global over all tracks such that groups can be defined across track and sub-track boundaries. The mapping of coded data to sub-tracks may depend on the media coding in use.

The track grouping mechanism of ISOBMFF can be used to indicate that tracks are grouped according to an indicated grouping criterion. The Track Group box included in the Track box enables indication of groups of tracks, where each group shares a particular characteristic or the tracks within a group have a particular relationship. The box contains zero or more boxes, and the particular characteristic or the relationship is indicated by the box type of the contained boxes. The contained boxes include an identifier (32-bit unsigned integer), which can be used to conclude the tracks belonging to the same track group. The tracks that contain the same type of a contained box within the Track Group Box and have the same identifier value within these contained boxes belong to the same track group.

However, neither the alternate group mechanism of tracks nor the track grouping mechanism is able to indicate relations of items to tracks.

Further, the sample grouping mechanism of ISOBMFF can be used to indicate that certain properties apply to an indicate group of samples within a track. This mechanism is not available for static items.

In the following some examples will be provided.

According to present embodiments, a container file format includes a mechanism that enables grouping of static media items (e.g. images) and timed media (e.g. video), which may be logically arranged in tracks.

A method according to an embodiment is illustrated in FIG. 16 as a flowchart. The method comprises including a static media item into a container file; including a media track into the container file; indicating, in the file, that the static media item and the media track form a group; and indicating, in the file, a grouping type for the group.

A method according to another embodiment is illustrated in FIG. 17 as a flowchart. The method comprises parsing, from a container file, that a static media item and a media track form a group; parsing, from the container file, a grouping type for the group; determining a processing for the static media item and the media track based on the group and the grouping type.

In an embodiment, a method comprises including a static media item into a container file; including one or more tracks into the container file; indicating, in the file, that the static media item and one or more of the following entities form a group:
- an indicated track of the one or more tracks;
- an indicated group of the one or more tracks, which may be e.g. an alternate group of tracks (and may be identified e.g. by the value of alternate_group syntax element of the ISOBMFF or similar syntax element) or a track group of certain indicated type;
- an indicated sub-track;
- an indicated sample grouping of a track referring to all samples that are mapped to any sample group description entries of the sample grouping;
- samples mapped to particular indicated sample group description entry or entries of an indicated sample grouping of an indicated track;
- another static media item;

and indicating, in the file, a grouping type for the group.

In an embodiment, a method comprises parsing, from a container file, that a static media item and one or more of the following entities from a group:
- an indicated track of the one or more tracks;
- an indicated group of the one or more tracks, which may be e.g. an alternate group of tracks (and may be identified e.g. by the value of alternate_group syntax element of the ISOBMFF or similar syntax element) or a track group of certain indicated type;
- an indicated sub-track;
- an indicated sample grouping of a track referring to all samples that are mapped to any sample group description entries of the sample grouping;
- samples mapped to particular indicated sample group description entry or entries of an indicated sample grouping of an indicated track;
- another static media item;

parsing, from the container file, a grouping type for the group; and determining a processing for the static media item and the one or more of the following entities based on the group and the grouping type.

The term entity may be refer collectively to any subset of an item, a track, a group of tracks, a sub-track, a set samples mapped to a sample grouping, and a set of samples mapped to particular sample group description entries of a sample grouping. One entity may an item, and another entity may be a track. Each entity may have an identifier, such as a 32-bit unsigned integer value. An entity may comprise a set of other entities.

In an embodiment, an entity comprises a static media item, a track, a group of tracks, a group of samples of a track, or a sub-track; and a method comprises including a first entity into a container file; including a second entity into the container file; indicating, in the file, that the first entity and the second entity form a group; and indicating, in the file, a grouping type for the group.

In an embodiment, an entity is associated with an identifier, such as a 32-bit unsigned integer, e.g. by including the identifier within the data structure of the entity. The method further comprises assigning a first identifier value to the first entity and a second identifier value to the second entity, the first identifier value differing from the second identifier value regardless of the types of the first entity and the second entity. It may be considered that the identifier values for entities use the same value space regardless of the type of the entities, when entity grouping is indicated in the file.

In an embodiment, an entity comprises a static media item, a track, a group of tracks, a group of samples of a track, or a sub-track; a method comprises parsing, from a container file, that a first entity and a second entity form a group; parsing, from the container file, a grouping type for the group; and determining a processing for the first entity and the second entity based on the group and the grouping type.

In an embodiment, a URL fragment identifier is specified to indicate a group and/or an entity. For example, a URL fragment "#entity_ID=" refers to an entity, which may have any type described earlier, such as an item or a track. An example of a URL including #entity_ID fragment may be as follows: http://www.example.com/file.mp4#entity_ID=100. In another example, a URL fragment "#group=4cc.id" refers to an entity grouping with type 4cc and with group_id id. An example of a URL including #entity_ID fragment may be as follows: http://www.example.com/file.mp4#group=altr.99. A client may request a subset of a file including certain entity or a certain group of entities using the above-described URL fragments, for example in an HTTP GET request. A server, a sender, a gateway, or alike may resolve a URL including an above-described URL fragment by including a subset of the file, comprising the requested entity or the requested group of entities, in the resolved URL, e.g. in the payload of an HTTP GET response.

When an image file format (e.g. MPEG-H) is used to encapsulate images and image sequences, there are use cases where either grouping of independently coded image items (when only the meta box construction is used) or grouping of independently coded image items and tracks of image sequences are required. The present embodiments provide the image file format with signaling structures that enable such a grouping mechanism. The signaling structures are generic in nature so as allow any conceivable grouping required by current and future use cases.

The grouping mechanism includes a way to indicate the type of the grouping. The type of the grouping may (but is not limited to) be one or more of the following:
- Alternate grouping indicating that the grouped items and tracks are alternatives to each other, and usually only one of them should be processed (e.g. decoded and displayed).
- Preview grouping indicating that an identified item or track is used for pre-view purposes for another identified item or track. For example, both a video track and a still image may be captured in a consequent or overlapping manner, and it may be indicated that the video track can be used as a pre-view for the still image, or vice versa that the still image may be used as a pre-view or a cover picture for the video track.

A grouping indicating that items or tracks have the same origin, e.g. that a collection of pre-computed derived images have been derived from the same input image. This may be used e.g. for different versions of the same set of images of the same scene with different exposure times.

A multiview grouping indicating that the grouped items or tracks represent the same scene from different viewpoints.

A grouping indicating equivalent items or tracks, i.e. items or tracks that represent the same image content. This grouping may be used or allowed only for a case where exactly one derived image is mapped to this grouping and one each coded image of the image grouping has been encoded by using the derived image as input to the encoding and hence is a coded representation of the derived image.

A grouping indicating that the items or tracks mapped to the group contain exactly the same coded image data. This grouping may be used in a case where an image is included as an item and a sample of track (only containing one sample) into a file, which may be used to indicate the timing of the image with respect to timed media included in the file.

The alternate grouping may (but is not limited to) be used for one or more of the following purposes or use cases:

Indicating an alternate group from which exactly one entity (e.g. one item or track) is selected to be decoded and displayed.

Indicating an animation (or alike) and a still image being alternatives: The alternate may be used for example if an animation and a still image are alternatives to be displayed, and the player can pick either the animation or the still image to be displayed e.g. based on its capability to decode animations.

Indicating optional operations for derived images: A first derived image and a second derived image may be indicated to be alternatives to each other, while the first derived image and the second derived image differ in terms of inputs and operations only so that the first derived image has fewer operations than the second derived image. The operations missing in the first derived image compared to the second derived image may hence be regarded as optional operations in the sense that an acceptable image (the second derived image) can be obtained without performing said missing operations. The alternate grouping mechanism can therefore be used for indicating optional operations for derived images.

Indicating that a pre-computed derived image and the respective derived image are alternatives: Grouping of a derived image and the respective codec image (for which the derived image or an image essentially similar to the derived image has been the input for encoding). The pre-computed derived image may require less processing in its reconstruction than the derived image, while it may involve some coding artefacts. On the other hand, the derived image may serve as metadata how the pre-computed derived image was constructed and can be used as input if further derivations are needed (in order to avoid the coding artefacts of the pre-computed derived image therein).

In an embodiment, the order of grouping items and/or tracks (e.g. in a data structure listing the grouped items and/or tracks) may bear semantics, such as a preference order. The semantics may depend on the grouping type.

According to an embodiment of Entity Grouping Mechanisms, a new container box called the GroupsList box ('grpl') is included in the file, e.g. as one among the optional boxes in the file-level 'meta' box. It may be required that there is at most one 'grpl' box present. The function of this box is to contain one or more other boxes, called EntityToGroup box, that fully defined all the different entity groupings used in the file. Each EntityToGroup box is specialized for one particular grouping, distinguished by a unique four-character code value. There may be multiple boxes with the same four-character code value included in the 'grpl" box indicating that there many multiple sets of entities with the same type of grouping in the file.

In an embodiment, the group itself may be identified using a group_id. This group_id is useful because it can be used to include the entities in this group in an even larger group. The members of the group is a list of identifiers where each of the identifiers is a valid entity identifier value, which may be e.g. item_id, track_id, or a group_id.

The syntax of GroupsListBox and EntityToGroupBox may be specified for example as follows. In this example group_id syntax element is included in EntityToGroupBox. It needs to be understood that the embodiment could be similarly realized without the group_id syntax element.

```
aligned(8) class GroupsListBox extends Box('grpl') {
}
aligned(8)class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++){
        unsigned int(32) entity_id;
}
```

In an embodiment, the semantics of EntityToGroupBox may be specified for example as follows:
grouping_type is a four-character code that represents a grouping type. Each grouping_type code is associated with semantics that describe the grouping.
group_id is a unique non-negative integer assigned to the particular grouping. The group_id is chosen from the same number space as the item_id or the track_id.
entity_id is a track_id, an item_id, or another group_id of the tracks, images, or other groups respectively that fall into this group.

In an embodiment, the semantics of EntityToGroupBox may be specified for example as follows:
grouping_type is a four-character code that represents a grouping type. Each grouping_type code is associated with semantics that describe the grouping.
group_id is a non-negative integer assigned to the particular grouping.
entity_id is resolved to an item or an alternate group of tracks or sub-tracks as follows:
When there is an item with item_id equal to entity_id, that item is mapping to this particular grouping.
When grouping_type is equal to 'altr', each track or sub-track with alternate_group equal to entity_id is a part of this group.

In an embodiment, additional parameters may be included in the file or parsed from the file for the grouping in order to fully characterize its nature. For this purpose, in one example implementation, the grouping_parameters field, which is an inherited object of an abstract base class GroupingParameters, is included in the EntityToGroup box. The fields in the grouping_parameters object may be defined on a per grouping basis (i.e. for each unique grouping_type value) and is optional in that it is included in the EntityToGroup box only if required for that grouping_type defined by the EntityToGroup box. For example, the following syntax may be used. In this example group_id syntax element is included in EntityToGroupBox. It needs to be understood that the embodiment could be similarly realized without the group_id syntax element.

```
abstract class GroupingParameters(grouping_type, version) {
}
aligned(8)class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++){
        unsigned int(32) entity_id;
    }
    GroupingParameters grouping_parameters(grouping_type,
version); //optional
}
```

In another example implementation, additional parameters may be included as list of attributes included in the EntityToGroup box. The presence of the list of attributes may be conditional on the grouping type, e.g. may be present for alternate grouping only (e.g. indicated by 'altr' four-character code). The number of attributes may be included in the EntityToGroup box (e.g. num_attributes in the syntax below), e.g. indicating the number of descriptive or differentiating attributes that describe the semantics of this grouping. Each attribute in the list may be for example a four-character code. For example, the following syntax may be used:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
    if(grouping_type == 'altr') {
        unsigned int(8) num_attributes;
        for(i=0; i<num_attributes; i++){
            unsigned int (32) attribute;
        }
    }
}
```

File writers may include, in the file, information whether an image item is intended for displaying. For example, a flag, which may e.g. be called item_in_presentation, in an initialization item or a metadata item linked to an image item may be used for this purpose. When item_in_presentation is equal to 0, the image item is not a part of the presentation, i.e. shall not be displayed. When item_in_presentation is greater than 0, the image item is a part of the presentation, i.e. may be displayed. item_in_presentation equal to 0 may be used for such a derived image that is an intermediate image used as an input to derive another derived image intended for display. File readers may parse, from the file, information whether an image item is intended for displaying. For example, a flag, which may e.g. be called item_in_presentation, may be parsed from an initialization item or a metadata item linked to an image item.

In an embodiment, said determining a processing based on the group and the grouping type in various embodiments comprises determination which entities, such as items or tracks, are decoded and displayed. In an example embodiment, a reader that is able to process image items but not image sequence tracks operates according to one or more of the following ordered steps. In this example embodiment it is assumed that entity_id in an example syntax above either indicated item_id or alternate_group. It needs to be understood that similar processes of determining the entities to be displayed can be formed for other options of allowed entity types, other options of syntax, and other order or content for the determination steps.

If the file is previewed, for example in a file explorer application, either a thumbnail image (if any) of the cover image or the cover image is displayed, whichever best suits the application or the use case.

Otherwise, if the reader supports displaying of only one image or if the application or the use case is such where only one image is displayed, the cover image is displayed.

Otherwise (the reader supports displaying of more than one image and the application or the use case is such where more than one image can be displayed), a set of displayed images is resolved as follows and then displayed as best suits the application or the use case, e.g. displaying a grid of images:

All image items are first included in the set of displayed images.

Thumbnail images and auxiliary images are excluded from the set of displayed images.

Image items with item_in_presentation equal to 0 are excluded from the set of displayed images.

Alternate groups of image items are resolved. Only the first image item of each alternate group that the reader can decode and play and that suits the application or the use case is kept in the set of displayed images, while the other images of the alternate group are excluded from the set of displayed images.

In an example embodiment, a reader that is able to process image items and image sequence tracks operates according to one or more of the following ordered steps when a file containing both image item(s) and image sequence track(s) is given as input. In this example embodiment it is assumed that entity_id in an example syntax above either indicated item_id or alternate_group. It needs to be understood that similar processes of determining the entities to be displayed can be formed for other options of allowed entity types, other options of syntax, and other order or content for the determination steps.

If the file is previewed, for example in a file explorer application, and the application or the use case does not support timed playback in previewing, either a thumbnail image of the cover image or the cover image should be displayed, whichever best suits the application or the use case.

Otherwise, if the file is previewed and the application or the use case supports timed playback in previewing, the following applies:

If the cover image is a part of an alternate group ('altr'), either a thumbnail of the cover image or the first entity from that alternate group that can be decoded and displayed should be displayed, whichever best suits the purpose of the application or use case.

Otherwise, either a thumbnail image of the cover image or the cover image should be displayed, whichever best suits the application or the use case.

Otherwise, a set of displayed entities is resolved as follows and then displayed as best suits the application or the use case, All image items and image sequence tracks are first included in the set of displayed entities.

Thumbnail images and auxiliary images are excluded from the set of displayed entities.

Image items with item_in_presentation equal to 0 are excluded from the set of displayed entities.

Image sequence tracks not intended to be displayed are excluded from the set of displayed entities. For example, in ISOBMFF tracks with Track_in_preview equal to 1, Track_in_movie equal to 0 or Track_enabled equal to 0 are excluded from the set of displayed entities. It may be required that auxiliary video or image sequence tracks have Track_in_movie equal to 0, or auxiliary video or image sequence tracks may be excluded from the set of displayed entities explicitly.

Alternate groups of tracks are resolved. Only one track per alternate group that best suits the application or the use case is kept in the set of displayed entities while the others are excluded from the set of displayed entities.

Alternate groups of entities are resolved. Only the first image item of each alternate group that the reader can decode and play and that suits the application or the use case is kept in the set of displayed entities, while the other entities of the alternate group are excluded from the set of displayed images. If the displayed entity is an alternate group of tracks, it has already been resolved into a single track as a result of the previous bullet point.

Instead of or in addition to using a flag, e.g. item_in_presentation, to indicate if an item is viewable, it may be required or recommended that an image item that is not the primary item and is not mapped to any grouping of type 'altr' is not be displayed.

In an embodiment, said determining a processing based on the group and the grouping type in various embodiments comprises determination which entities, such as items or tracks, are decoded and displayed. In an example embodiment, a reader that is able to process image items but not image sequence tracks operates according to one or more of the following ordered steps. In this example embodiment it is assumed that entity_id in an example syntax above either indicated item_id or alternate_group. It needs to be understood that similar processes of determining the entities to be displayed can be formed for other options of allowed entity types, other options of syntax, and other order or content for the determination steps.

If the reader supports displaying of only one image or if the application or the use case is such where only one image is displayed, one of the following images or their thumbnail images should be displayed whichever can be decoded and best suits the application or the use case:
the primary item,
an image from the alternate group ('altr') including the primary item.

Otherwise (the reader supports displaying of more than one image and the application or the use case is such where more than one image can be displayed), a set of displayed images is resolved as follows and then displayed as best suits the application or the use case, e.g. displaying a grid of images:

Alternate groups of image items are resolved. Only the first image item of each alternate group that the reader can decode and play and that suits the application or the use case is included in the set of displayed images.

When the primary item is not among any alternate group, it is included in the set of displayed images.

In an example embodiment, a reader that is able to process image items and image sequence tracks operates according to one or more of the following ordered steps when a file containing both image item(s) and image sequence track(s) is given as input. In this example embodiment it is assumed that entity_id in an example syntax above either indicated item_id or alternate_group. It needs to be understood that similar processes of determining the entities to be displayed can be formed for other options of allowed entity types, other options of syntax, and other order or content for the determination steps.

If the reader supports displaying of only one image or image sequence, or if the application or the use case is such where only one image or image sequence is displayed, one of the following images or their thumbnail images should be displayed whichever can be decoded and best suits the application or the use case:
the primary item,
an entity from the alternate group ('altr') including the primary item.

Otherwise, a set of displayed entities is resolved as follows and then displayed as best suits the application or the use case, Alternate groups of entities are resolved. Only the first entity of each alternate group that the reader can decode and play and that suits the application or the use case is included in the set of displayed entities, while the other entities of the alternate group are excluded from the set of displayed images. If the displayed entity is an alternate group of tracks, it is resolved into a single track as a result of the next bullet point.

Those alternate groups of tracks that were not included in any alternate group of entities or were selected in the previous bullet point as an entity to be displayed are resolved. Only one track per alternate group that best suits the application or the use case is included in the set of displayed entities.

When the primary item is not among any alternate group and can be decoded, it is included in the set of displayed images.

When a track is not indicated to be part of any alternate group of tracks (i.e. has alternate_group equal to 0 in the ISOBMFF), is playable (i.e. has Track_in_movie equal to 1 and Track_enabled equal to 1 in the ISOBMFF) and can be decoded, it is included the set of displayed entities.

As an example of a first use case, a signal alternative representation of image items is disclosed. Images that are alternates of each other can use item-groups to indicate to a file reader that the items in the group are alternates of each other and it could choose any of the item in the group that it can best render.

Figure 6B:
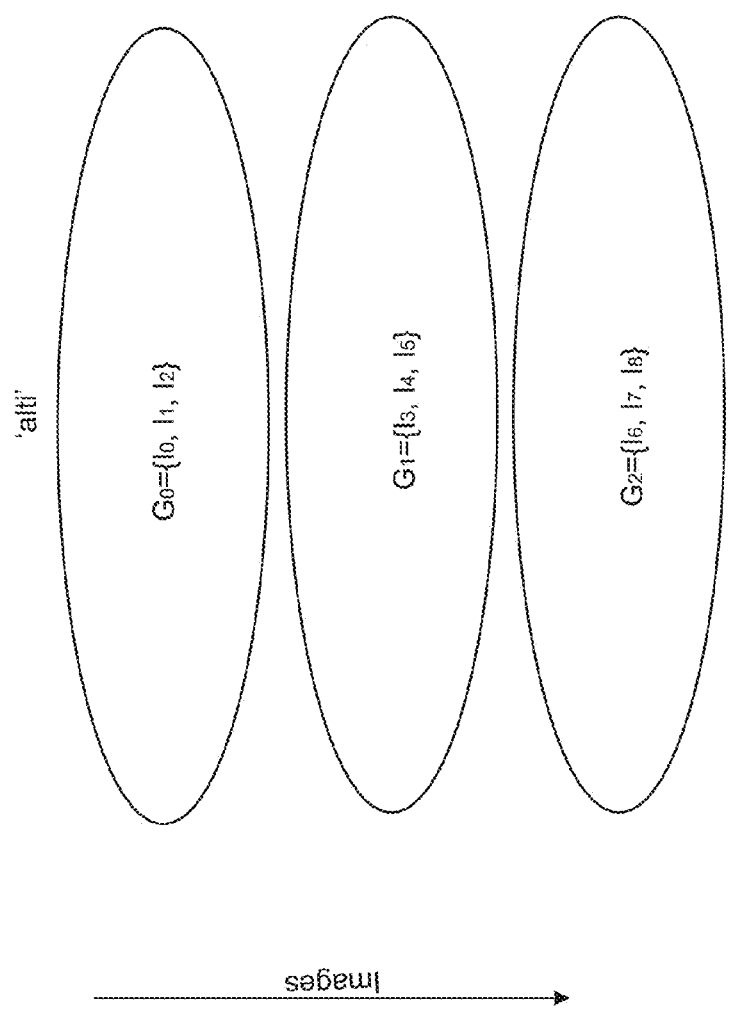
FIG. 6a-b illustrate images and their item-ids, and different grouping of items.
Figure 6A:
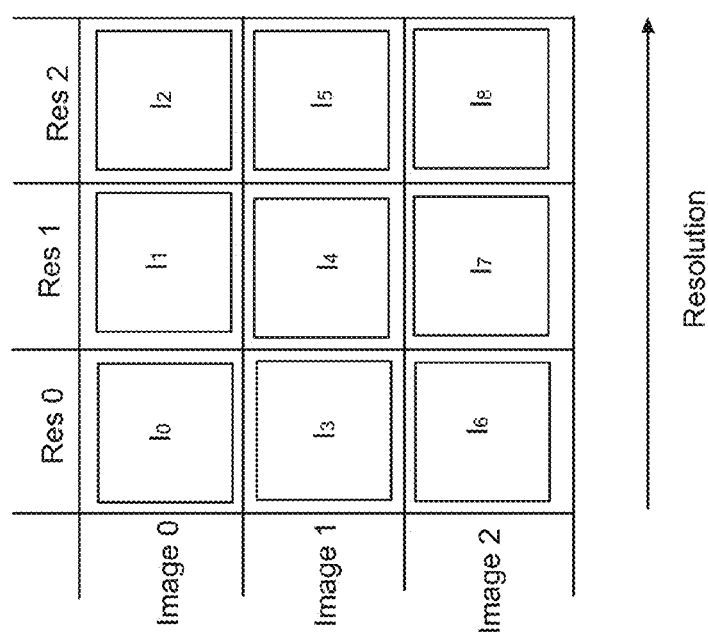
Figure 7:
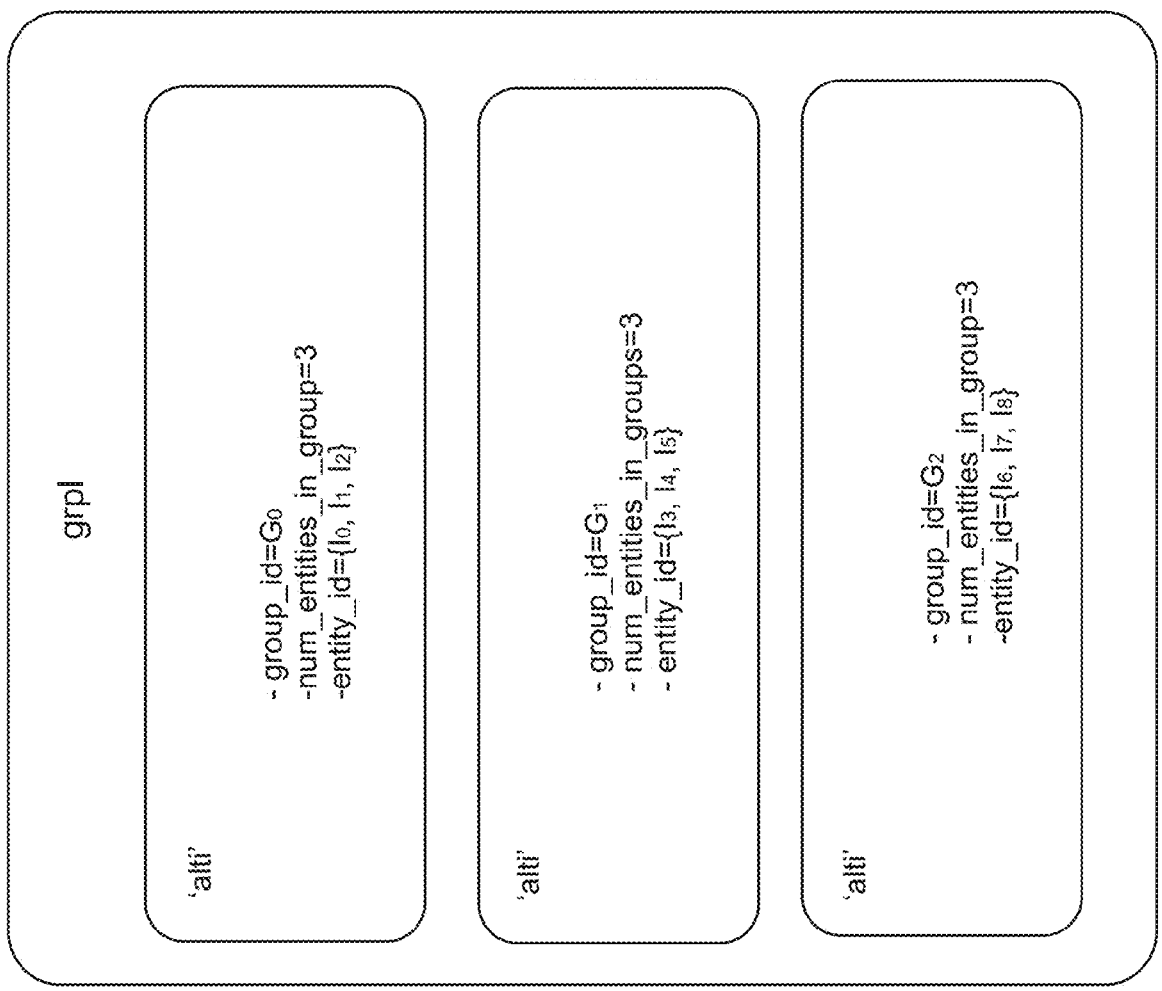
FIG. 7 illustrates content of a 'grpl' box according to an embodiment.

For example, consider a set of three images (Image 0, Image 1, Image 2) where each image is coded at three different spatial resolution (Res 0, Res 1, Res 2) as shown in FIG. 6a. These images are stored as items ($I_0$, $I_1$, $I_2$, $I_3$, $I_4$, $I_5$, $I_6$, $I_7$, $I_8$) using the 'meta' structure. The different spatial resolution of the images are stored in the file because the content provider wants a reader to use the image which most suits its display capabilities. The grouping ($G_0$, $G_1$, $G_2$), as shown in FIG. 6b, can be used to signal alternative representations where the signaling of the grouping itself uses the present embodiments.

Using the grouping mechanism presented in this application the above described grouping of items can be implemented by using a new grouping with four-character code-value 'alti'. Each 'alti' box groups items that are alternate representations for each other. All the 'alti' boxes are then collected into the 'grpl' box. This is illustrated in Error! Reference source not found. 7, showing the content or 'grpl' box.

Figure 8:
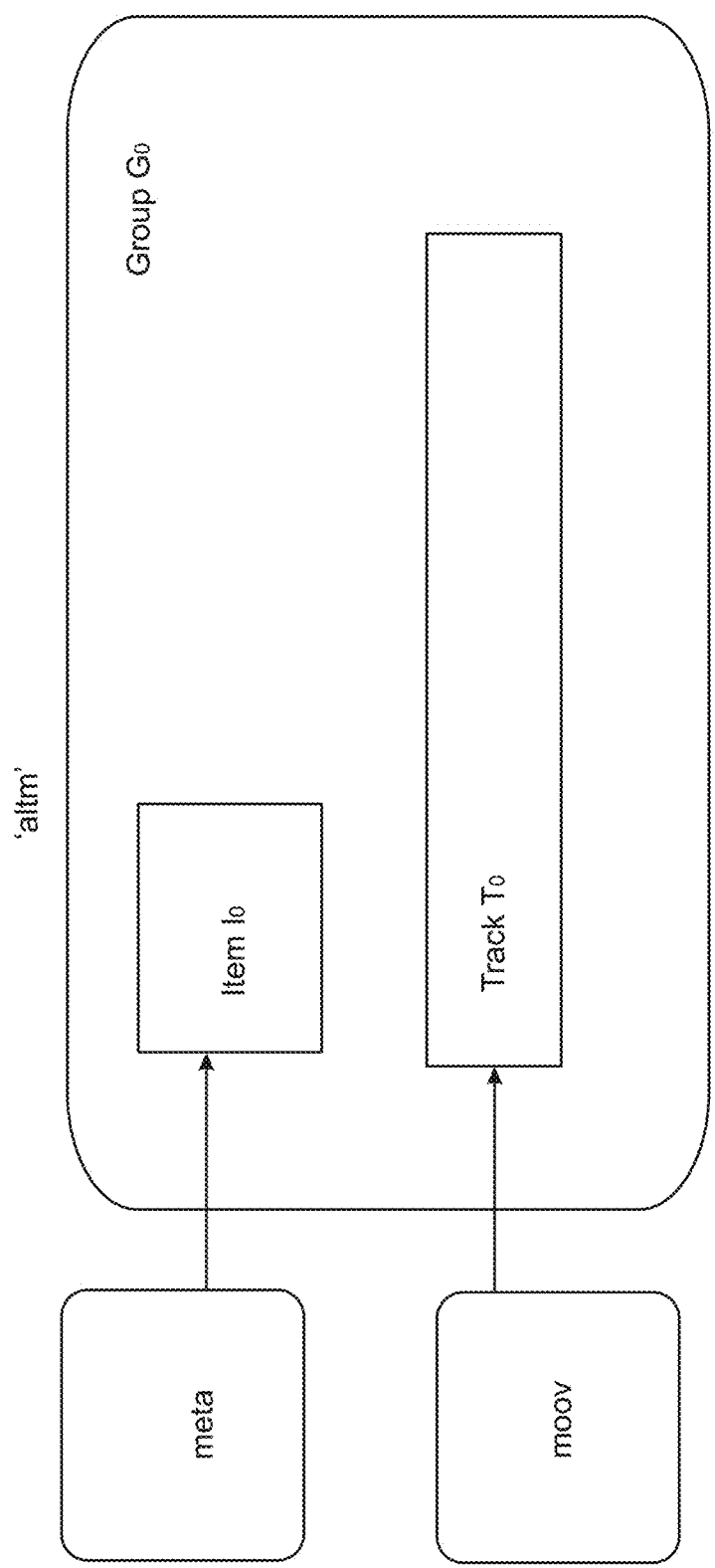
FIG. 8 illustrates an example of a track base media and item based media and their relation.

As an example of a second use case, signalling of alternative media representations is disclosed. The grouping mechanism can also be used to group two different media types. Consider an example where a camera shoots a small image sequence along with a high resolution image to capture a scene. Both the image sequence and the high resolution image are stored in the same file. A reader then chooses the media type that it best renders or provide the user with an option to choose the media they want rendered. The illustration of this example is shown in FIG. 8, where a track base media (Track $T_0$) and an item based media (Item $I_0$) are related to each other and can be considered a group (Group $G_0$).

Figure 9:
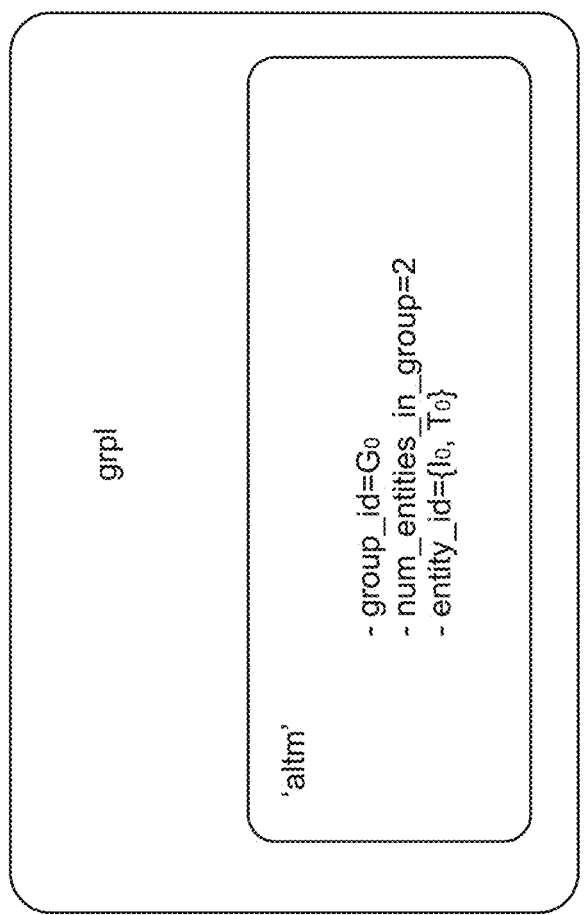
FIG. 9 illustrates a content of a 'grpl' box according to an embodiment.

Using the grouping mechanism presented in this application, grouping of a combination of items and tracks can be implemented by using a new grouping with four-character code value 'altm'. Each 'altm' box groups items and tracks that are alternate representations for each other. All the 'altm' boxes are then collected into the 'grpl' box. This is illustrated in FIG. 9 showing contents of the 'grpl' box.

Figure 10:
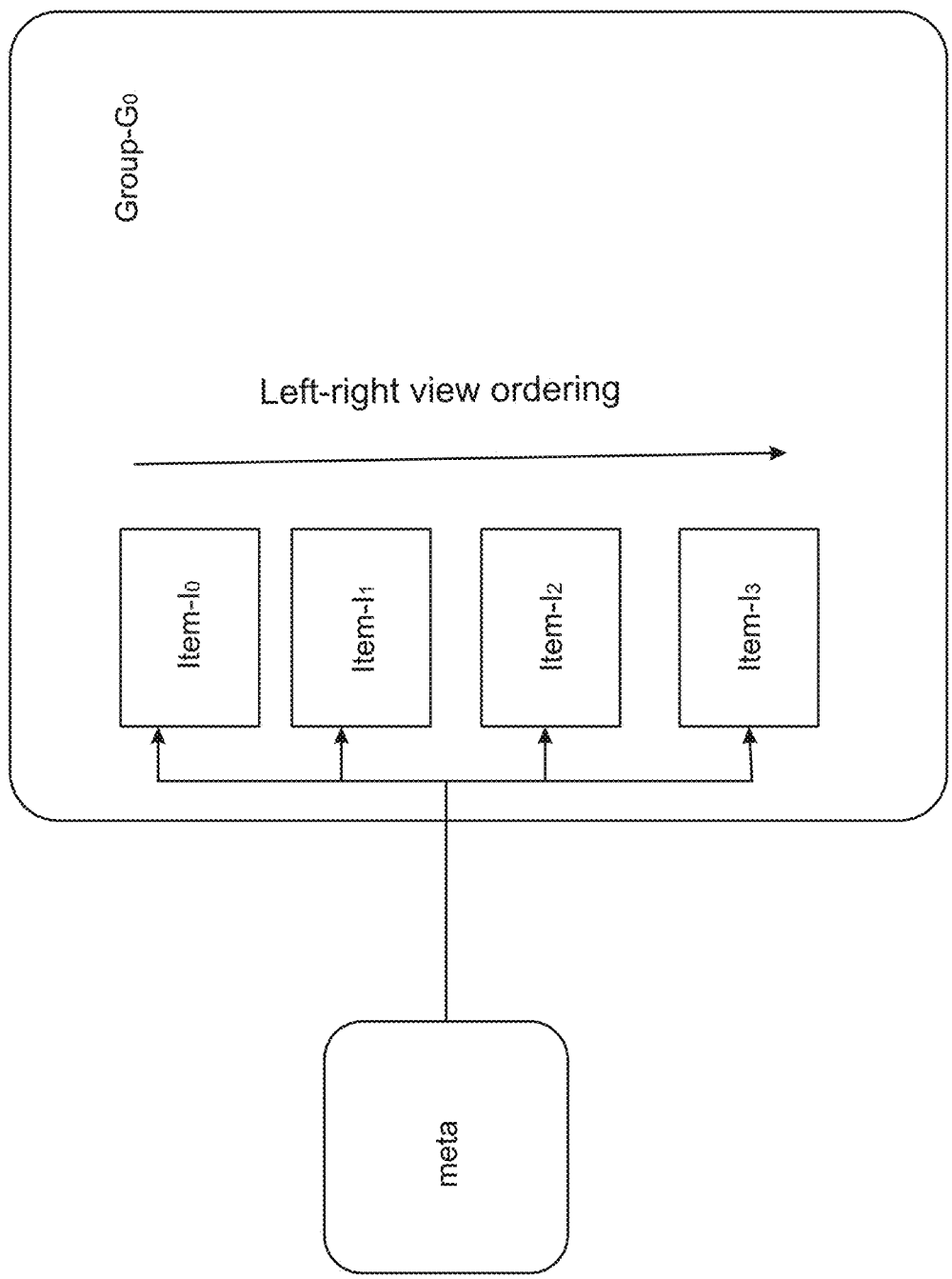
FIG. 10 illustrates an example of a grouping of image items.

As an example of a third use case, signalling of a multi-view group is disclosed. Image items (Item-$I_0$, Item-$I_1$, Item-$I_2$, Item-$I_3$) can also be grouped (Group-$G_0$) to signal that they belong to a multi-view group. The images themselves are all independently coded, so they can all be rendered individually by a normal image renderer. However, if the reader is capable of providing a multi-view rendering of a collection of images (by using view interpolation techniques) then the grouping method presented in this application can be used. FIG. 10 illustrates such a grouping. Grouping of image items that captures the same scene at different view angles. These image items all form a group that a multi-view image renderer can use to render the output image.

Figure 11:
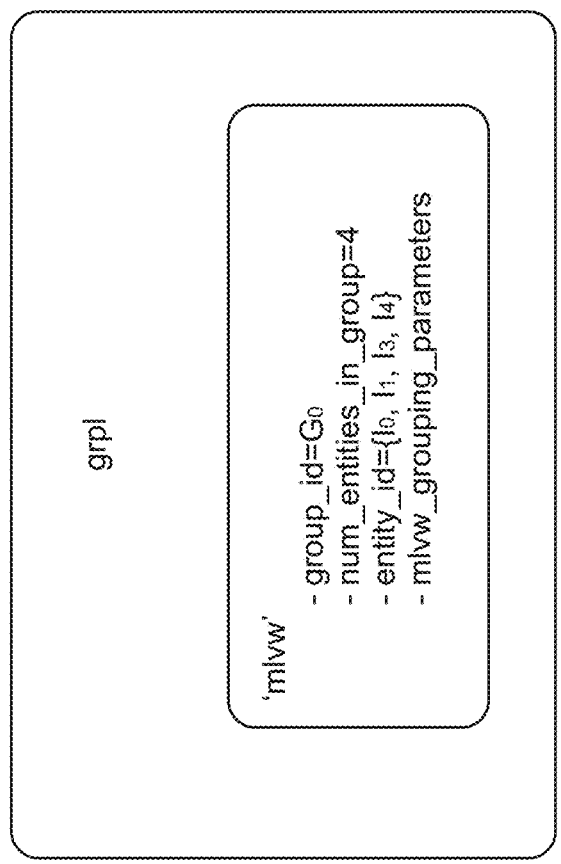
FIG. 11 illustrates a content of a 'grpl' box according to an embodiment.

Using the grouping mechanism presented in this application, an image collection that renders the same scene at multiple angles can be signaled to be a multi-view group using a new grouping with four-character code value 'mlvw'. Each 'mlvw' box groups items that belong to the multi-view group. All the 'mlvw' boxes are then collected into the 'grpl' box. This is illustrated in FIG. 11 showing contents of the 'grpl' box.

This grouping requires the grouping_parameters field to signal the intrinsic camera parameters. Intrinsic camera parameters associates the pixel coordinates of an image point with the corresponding coordinates in the camera reference frame. The specification of focal length and parameter related to geometric distortion due to camera optics is given in Annex H of ISO/IEC 14496-10.

```
aligned(8) class MLVWGroupingParameters('mlvw', version)
    extends GroupingParameters( ) {
        for(i=0; i<num_entities_in_group; i++){
            unsigned   int(32)   prec_focal_length;
            unsigned   int(32)   prec_principal_point;
            unsigned   int(32)   prec_skew_factor;
            unsigned   int(8)    exponent_focal_length_x;
            signed     int(64)   mantissa_focal_length_x;
            unsigned   int(8)    exponent_focal_length_y;
            signed     int(64)   mantissa_focal_length_y;
            unsigned   int(8)    exponent_principal_point_x;
            signed     int(64)   mantissa_principal_point_x;
            unsigned   int(8)    exponent_principal_point_y;
            signed     int(64)   mantissa_principal_point_y;
            unsigned   int(8)    exponent_skew_factor;
            signed     int(64)   mantissa_skew_factor;
        }
    }
```

Semantics:

prec_focal_length specifies the exponent of the maximum allowable truncation error for focal_length_x and focal_length_y as given by $2^{-prec\_focal\_length}$. The value of prec_focal_length shall be in the range of 0 to 31, inclusive.

prec_principal_point specifies the exponent of the maximum allowable truncation error for principal_point_x and principal_point_y as given by $2^{-prec\_principal\_point}$. The value of prec_principal_point shall be in the range of 0 to 31, inclusive.

prec_skew_factor specifies the exponent of the maximum allowable truncation error for skew factor as given by $2^{-prec\_skew\_factor}$. The value of prec_skew_factor shall be in the range of 0 to 31, inclusive.

exponent_focal_length_x specifies the exponent part of the focal length in the horizontal direction. The value of exponent_focal_length_x shall be in the range of 0 to 62, inclusive. The value 63 is reserved for future use by ITU-T|ISO/IEC. Decoders shall treat the value 63 as indicating an unspecified focal length.

mantissa_focal_length_x specifies the mantissa part of the focal length of the i-th camera in the horizontal direction.

exponent_focal_length_y specifies the exponent part of the focal length in the vertical direction. The value of exponent_focal_length_y shall be in the range of 0 to 62, inclusive. The value 63 is reserved for future use by ITU-T|ISO/IEC. Decoders shall treat the value 63 as indicating an unspecified focal length.

mantissa_focal_length_y specifies the mantissa part of the focal length in the vertical direction.

mantissa_principal_point_x specifies the mantissa part of the principal point in the horizontal direction.

exponent_principal_point_y specifies the exponent part of the principal point in the vertical direction. The value of exponent_principal_point_y shall be in the range of 0 to 62, inclusive. The value 63 is reserved for future use by ITU-T|ISO/IEC. Decoders shall treat the value 63 as indicating an unspecified principal point.

mantissa_principal_point_y specifies the mantissa part of the principal point in the vertical direction.

exponent_skew_factor specifies the exponent part of the skew factor. The value of exponent_skew_factor shall be in the range of 0 to 62, inclusive. The value 63 is reserved for future use by ITU-T|ISO/IEC. Decoders shall treat the value 63 as indicating an unspecified skew factor.

mantissa_skew_factor specifies the mantissa part of the skew factor.

The intrinsic matrix A for the camera may be represented as follows:

$$\begin{bmatrix} focalLengthX & skewfactor & principalPointX \\ 0 & focalLengthY & principalPointY \\ 0 & 0 & 0 \end{bmatrix}$$

Each component of the intrinsic matrix is obtained from the variables specified in Table 1 as the variable x computed as follows:

If $0<e<63$, $x=2^{e-31}*(1+n\div2^v)$, with $v=\max(0, e+p-31)$

If e is equal to 0, $x=2^{-(30+v)}*n$, with $v=\max(0, p-30)$

Table 1, below, shows an association between camera parameter variables and syntax elements:

| x | e | n | p |
|---|---|---|---|
| focalLengthX | exponent_focal_length_x | mantissa_focal_length_x | prec_focal_length |
| focalLengthY | exponent_focal_length_y | mantissa_focal_length_y | prec_focal_length |
| principalPointX | exponent_principal_point_x | mantissa_principal_point_x | prec_principal_point |
| principalPointY | exponent_principal_point_y | mantissa_principal_point_y | prec_principal_point |
| skewFactor | exponent_skew_factor | mantissa_skew_factor | prec_skew_factor |

As an example of a fourth use case, signalling of a presentable image items group is disclosed.

In a grouping mechanism presented in this application, coded image items and items that provides instructions for deriving another image can be grouped to signal that the items in the group form an image that can be displayed if the reader so wishes to. This grouping is useful to indicate to the reader that certain combinations of items along a chain of image derivation are not intended to be presented. Such a grouping can be multi-layered; i.e. larger groups can consist of smaller groups.

Figure 12:
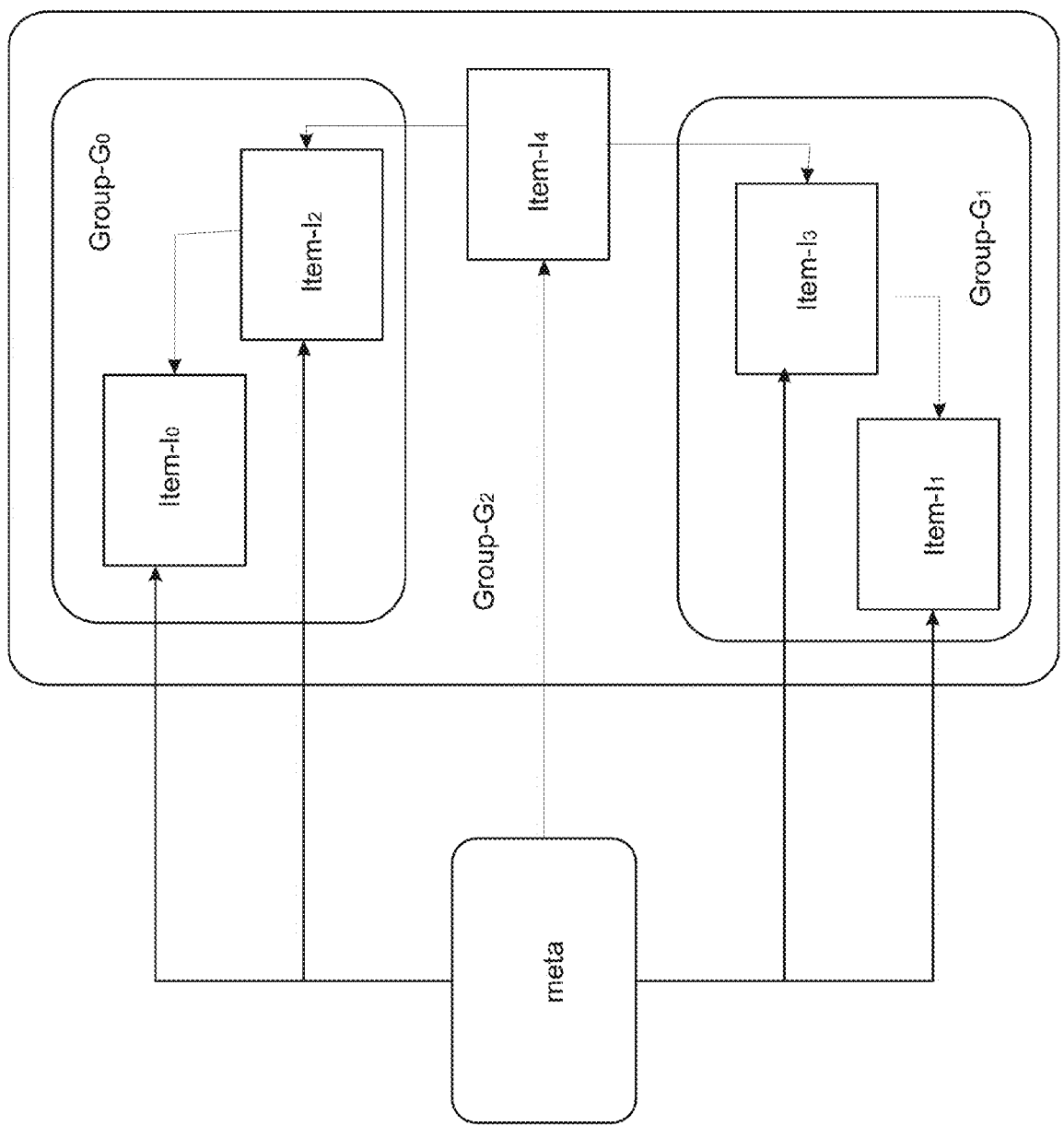
FIG. 12 illustrates an example of grouping of media items and derived image items that output a valid displayable image.

FIG. 12 shows grouping of image items and derived image items that output a valid displayable image. In this example assume that item-$I_0$ and item $I_1$ are coded images. Item-$I_2$ modifies item-$I_0$ by cropping the image of item-$I_0$ (using the derived image item type 'clap'). Item-$I_3$ derived a rotated image from Item-$I_1$ (using the derived image item type 'irot'). Item-$I_4$ combines the derived images obtained at the output of item-$I_2$ and item-$I_3$ to form an overlay image (using the item type 'iovl'). To indicate to a reader which combination of items results in a presentable image, groups can be formed.

Figure 13:
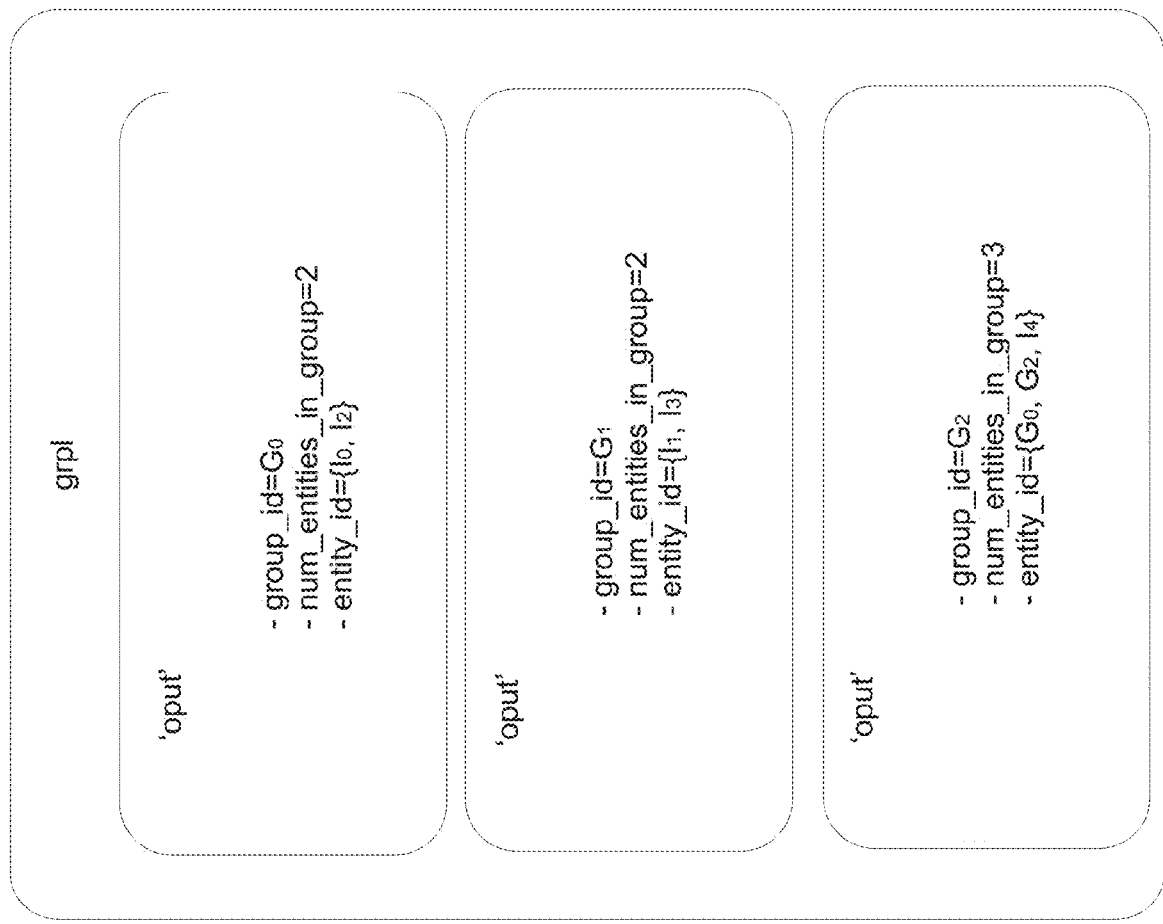
FIG. 13 illustrates a content of a 'grpl' box according to an embodiment.

In this example of using the grouping mechanism to signal item combination that result in a presentable picture, a new grouping with four-character code value 'oput' can be constructed. Each 'oput' box groups items that combine to produce a picture at the output. All the 'oput' boxes are then collected into the 'grpl' box. This is illustrated in FIG. 13 showing contents of the 'grpl' box.

As an example of a fifth use case, grouping to inform derived images and their pre-computed image alternates is disclosed.

In some use cases, derived images (image items in combination with instructions used to derive other images) and a version that has already been pre-computed can be included in the same file. This is to enable editors to have the facility to retrace the steps of edits applied on the original images and possibly modify a step in the derivation process while still allowing simple image renderers to take the pre-computed image and display (to avoid complicated process of derivation). The grouping method described in this application can be used to signal to a file reading entity about the alternates included in the file.

Figure 14:
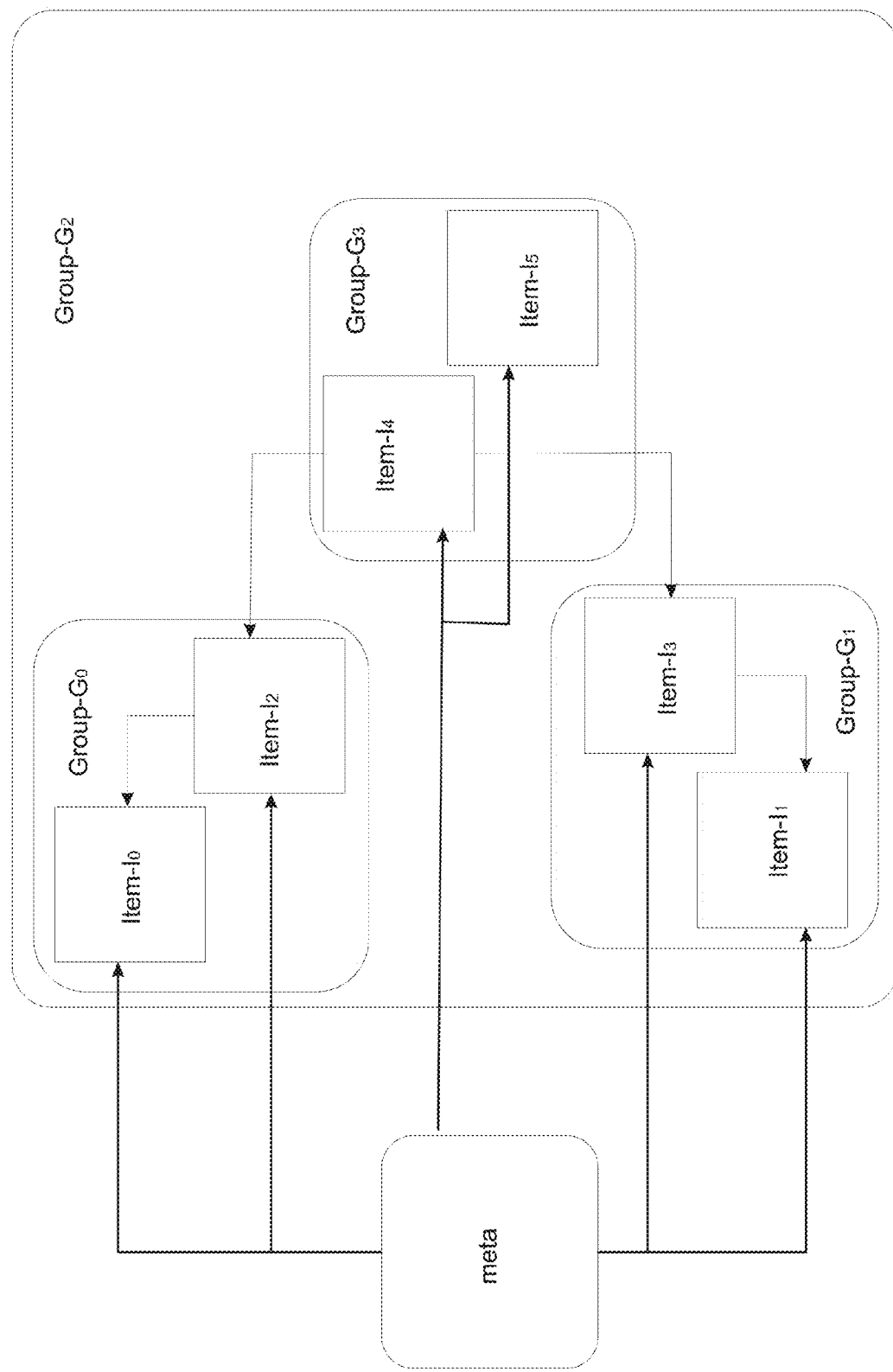
FIG. 14 illustrates an example of grouping of precomputed derived image item and items that belong to the derived image.
Figure 15:
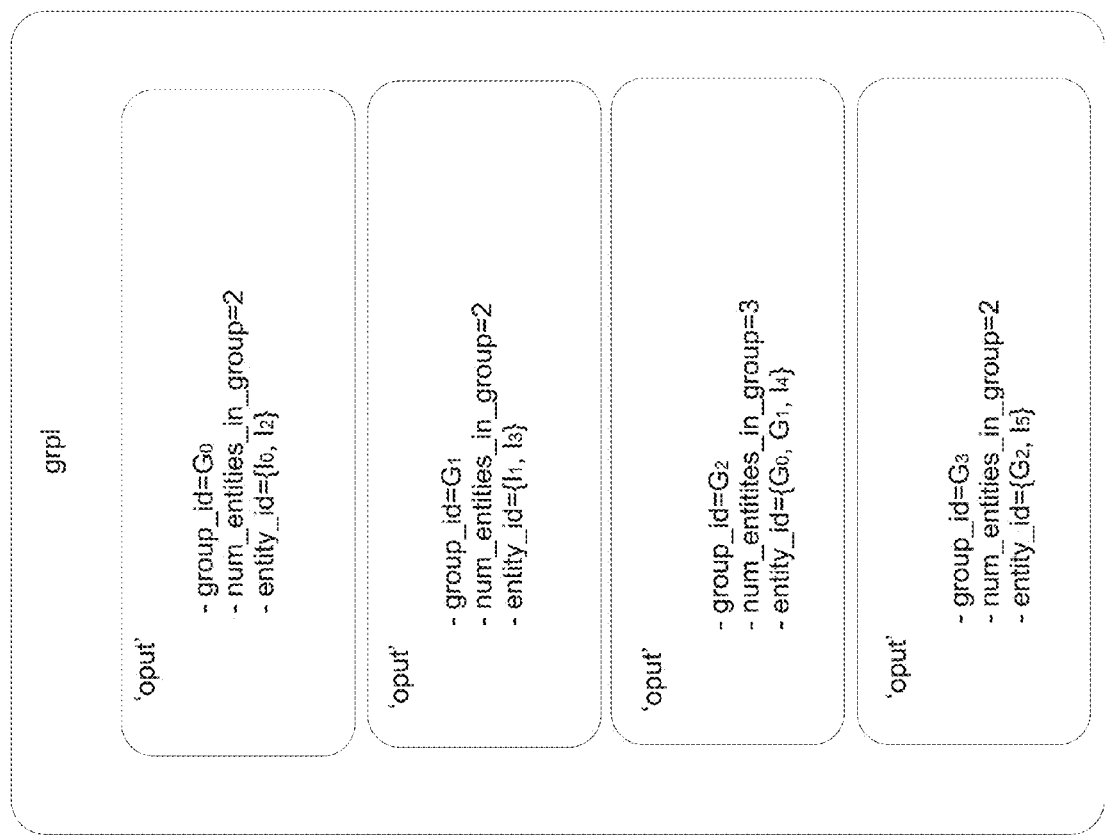
FIG. 15 illustrates a content of a 'grpl' box according to an embodiment.

To illustrate this with an example, the previous example of presentable item groups is extended to include another image item, item-$I_5$, which pre-computes the derived image obtained after the overlay operation at item-$I_4$. This is shown in FIG. 14. FIG. 15 lists the contents of the 'grpl' box.

An embodiment, which may be applied independently of or together with other embodiments, a file creator may include, in a file, information of alternative pictures and/or a file player may parse, from a file, information on alternative pictures.

Two or more pictures may be defined as alternatives to each other, when only one of a file player should display only one of the two or more pictures.

An alternate group of pictures may be defined as the set of pictures that are alternatives to each other.

The alternate group may have a sub-type, indicating the characteristics and/or criteria differentiating the second picture and the first picture.

According to an embodiment, a first picture may be associated with, in the file, a first value of an alternate group identifier and a second picture may be associated with, in the file, a second value of an alternate group identifier. The file creator may indicate that the first picture and the second picture are alternatives by setting the first value and the second value to the same value. The file creator may indicate that the first picture and the second picture are not alternatives by setting the first value and the second value to a different value from each other. The file player may determine that the first picture and the second picture are alternatives by parsing, from the file, that the first value is equal to the second value. The file player may determine that the first picture and the second picture are not alternatives by parsing, from the file, that the first value is not equal to the second value.

According to an embodiment, the file creator may include in the file information on more than alternate group of pictures. In an embodiment, a picture may be belong to more than one alternate group. In an embodiment, the file creator may include in the file characteristics and/or criteria according to which an alternate group is formed. For example, it may be indicated that an alternate group represents different spatial resolutions and/or picture aspect ratio of the same picture content. In another example, it may be indicated that an alternate group represents different bit depths and/or color gamuts of the same picture content. In an embodiment, a file player may parse, from a file, characteristics and/or criteria according to which an alternate group is formed and, if the characteristics and/or criteria are such that could matter for the file player to choose the picture among the pictures in the alternate group, the file player may parse, from the file, picture-specific information related to the characteristics and/or criteria and select the picture among the alternate group according to the picture-specific information.

According to an embodiment, the file creator may indicate that one or more (individual) pictures and one or more image sequence are alternatives. For example, a file creator may indicate that an animation, such as a cinemagraph, is an alternative to a still picture. In the image file format or other ISOBMFF derivative formats, the file creator may indicate that one or more meta items representing pictures are alternatives to one or more tracks, typically representing image sequences or video.

According to an embodiment, the file player may parse, from a file, that one or more (individual) pictures and one or more image sequence are alternatives. For example, a file parser may parse, from the file, that an animation, such as a cinemagraph, is an alternative to a still picture. In the image file format or other ISOBMFF derivative formats, the file parser may parse, from the file, that one or more meta items representing pictures are alternatives to one or more tracks, typically representing image sequences or video.

In an embodiment applicable to the image file format or other ISOBMFF derivative formats, entities, such as the meta items and tracks may be indicated to have identifier values (item_id and track_id values, respectively) that are reserved from the same value space. In other words, when indicated, an item_id value and a track_id value are not allowed to be equal. The indication may be for example included in a brand requirement so that, for example, whenever an Image File Format brand is included as a major brand or as a compatible brand, the meta items and tracks may be indicated to have identifier values (item_id and track_id values, respectively) that are reserved from the same value space.

According to an embodiment, an alternate group may be indicated as a set of identifier values that can be resolved to be either item_id values or track_id values, provided that the meta items and tracks may be indicated to have identifier values (item_id and track_id values, respectively) that are reserved from the same value space.

According to an embodiment, a reference to an alternative picture or picture sequence, is indicated as one or more identifier values. The identifier value(s) can be resolved to be either item_id values or track_id values, provided that the meta items and tracks may be indicated to have identifier values (item_id and track_id values, respectively) that are reserved from the same value space. In some embodiments, the reference is an item reference that is generalized to also apply to tracks; in some embodiments the reference is a track reference that is generalized to also apply to items; in some embodiments the reference can be both an item reference and a track reference.

The present embodiments provide advantages. The embodiments provide a mechanism to group items, a combination of items and tracks, or a smaller groups into bigger groups that represent some common semantics. The grouping can be used by file reader to decide on the best use of the file.

In the above, some embodiments have been described with reference to particular syntax and/or particular semantics. It needs to be understood that the embodiments are not limited to these particular pieces of syntax and/or semantics but could be similarly realized with other syntax or semantics.

In the above, some embodiments have been described for the MPEG-H Image File Format and/or the ISO Base Media File Format. It needs to be understood that the embodiments are not limited to these file format but could be similarly described for other file formats, such as Matroska.

In the above, some embodiments have been described in relation to image items. It needs to be understood that embodiments may be applied to any types of items and/or other entities. For example, photographic metadata may be stored using a first item containing metadata formatted according to the exchangeable image file format (Exif) metadata and a second item containing metadata formatted according to the Extensible Metadata Platform (XMP) specification. When the first item and the second item represent the same metadata, they may be indicated to be equivalent using the entity grouping mechanism (e.g. 'eqvl' grouping type as described above). Other relations may be specified, with other grouping types, e.g. a superset relation where a first listed item is semantically a superset of a second listed item in the same grouping.

In the above, some embodiments have been described in relation to a player or a file player. It needs to be understood that other terms could be interchangeably used, such as reader, parser, user agent, or client. It needs to be understood that a player can but needs not be a standalone application. A player can be embedded for example in a web browser and/or can be a component within a chain or filter graph of media processing.

In the above, some embodiments have been described in relation to a file creator. It needs to be understood that other terms could be interchangeably used, such as writer, file writer, file generator, or content provider. It needs to be understood that a creator can but needs not be a standalone application. A file creator can be embedded for example in a web server, e.g. using scripts, and/or can be a component within a chain or filter graph of media processing.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

The various embodiments can further be implemented by a computer program product comprising a computer-readable medium bearing computer program code embodied therein for use with a computer, the computer program code comprising: including a static media item into a container file; including a media track into the container file; indicating, in the file, that the static media item and the media track form a group; and indicating, in the file, a grouping type for the group. Yet, the various embodiments can be further implemented by a computer program product comprising computer-readable medium bearing computer program code embodied therein for use with a computer, the computer program code comprising: parsing, from a container file, that a static media item and a media track form a group; parsing, from the container file, a grouping type for the group; determining a processing for the static media item and the media track based on the group and the grouping type.

The various embodiments can further be implemented by a an apparatus comprising means for processing; means for encoding; means for including a static media item into a container file; means for including a media track into the container file; means for indicating, in the file, that the static media item and the media track form a group; and means for indicating, in the file, a grouping type for the group. Yet, the various embodiments can be further implemented by an apparatus comprising means for processing; means for decoding; means for parsing, from a container file, that a static media item and a media track form a group; means for parsing, from the container file, a grouping type for the group; and means for determining a processing for the static media item and the media track based on the group and the grouping type.

It is obvious that the present invention is not limited solely to the above-presented embodiments, but it can be modified within the scope of the appended claims.

The invention claimed is:

1. An encoding method comprising:
   including at least one static media item into a container file;
   including at least one media tracks into the container file;
   indicating, in the file, by a list of identifier values that a subset of the at least one static media item and the at least one media track are entities of a group, wherein each identifier value identifies one of a static media item or a media track from the at least one static media item and the at least one media track; and
   indicating, in the file, a grouping type for the group, wherein the grouping type indicates that the entities of the group are alternatives to each other for decoding and displaying, and wherein the list of identifier values indicates a preference order for decoding and displaying.

2. The method according to claim 1, comprising including information of alternative pictures into the container file.

3. The method according to 2, wherein information of alternative pictures relates to alternate groups of pictures, based on one of the following characteristics: different spatial resolutions; different picture aspect ratio; different bit depths; different color gamuts.

4. A decoding method comprising
   parsing, from a container file, a list of identifier values that indicate that a subset of at least one static media item and at least one media track are entities of a group, wherein each identifier value identifies one of a static media item or a media track from the at least one static media item and the at least one media track;
   parsing, from the container file, a grouping type for the group; and
   determining a processing for the at least one static media item and the at least one media track based on the group and the grouping type, wherein the grouping type indicates that the entities of the group are alternatives to each other for decoding and displaying, and wherein the list of identifier values indicates a preference order for decoding and displaying.

5. The method according to claim 4, comprising parsing information of alternative pictures from the container file.

6. The method according to claim 5, determining that a first picture and a second picture are alternatives by parsing that a first value associated with the first picture and a second value associated with the second picture have a same value.

7. The method according to 5, parsing from the container file the media file characteristics according to which an alternate group is formed, and picture-specific information related to the characteristics.

8. An apparatus comprising at least one processor; and at least one memory including computer program code the at least one memory and the computer program code configured to, with the at least one processor, cause the apparatus to perform at least the following:
   including at least one static media item into a container file;
   including at least one media tracks into the container file;
   indicating, in the file, by a list of identifier values that a subset of the at least one static media item and the at least one media track are entities of a group, wherein each identifier value identifies one of a static media item or a media track from the at least one static media item and the at least one media track; and
   indicating, in the file, a grouping type for the group, wherein the grouping type indicates that the entities of the group are alternatives to each other for decoding and displaying, and wherein the list of identifier values indicates a preference order for decoding and displaying.

9. An apparatus comprising at least one processor; and at least one memory including computer program code the at least one memory and the computer program code configured to, with the at least one processor, cause the apparatus to perform at least the following:
   parsing, from a container file, a list of identifier values that indicate that a subset of at least one static media item and at least one media track are entities of a group, wherein each identifier value identifies one of a static media item or a media track from the at least one static media item and the at least one media track;
   parsing, from the container file, a grouping type for the group; and
   determining a processing for the at least one static media item and the at least one media track based on the group and the grouping type, wherein the grouping type indicates that the entities of the group are alternatives to each other for decoding and displaying, and wherein the list of identifier values indicates a preference order for decoding and displaying.

10. A non-transitory computer-readable medium encoded with instructions that, when executed by a computer, perform:
    including at least one static media item into a container file;
    including at least one media tracks into the container file;
    indicating, in the file, by a list of identifier values that a subset of the at least one static media item and the at least one media track are entities of a group, wherein each identifier value identifies one of a static media item or a media track from the at least one static media item and the at least one media track; and
    indicating, in the file, a grouping type for the group, wherein the grouping type indicates that the entities of the group are alternatives to each other for decoding and displaying, and wherein the list of identifier values indicates a preference order for decoding and displaying.

11. A non-transitory computer-readable medium encoded with instructions that, when executed by a computer, perform:
    parsing, from a container file, a list of identifier values that indicate that a subset of at least one static media item and at least one media track are entities of a group, wherein each identifier value identifies one of a static media item or a media track from the at least one static media item and the at least one media track;
    parsing, from the container file, a grouping type for the group; and
    determining a processing for the at least one static media item and the at least one media track based on the group and the grouping type, wherein the grouping type indicates that the entities of the group are alternatives to each other for decoding and displaying, and wherein the list of identifier values indicates a preference order for decoding and displaying.

* * * * *